United States Patent
Salomon et al.

(10) Patent No.: US 11,328,082 B2
(45) Date of Patent: May 10, 2022

(54) DIFFERENTIAL PRIVACY FOR ENCRYPTED DATA

(71) Applicant: Switchbit, Inc., San Francisco, CA (US)

(72) Inventors: Yacov Salomon, Danville, CA (US); Seth Yates, Danville, CA (US); Maxwell Anderson, San Francisco, CA (US); Vivek Vaidya, San Francisco, CA (US); Anton Winter, San Mateo, CA (US); Samuel Alexander, San Francisco, CA (US); Tom Chavez, San Francisco, CA (US)

(73) Assignee: Ketch Kloud, Inc., San Francisco, CA (US)

(*) Notice: Subject to any disclaimer, the term of this patent is extended or adjusted under 35 U.S.C. 154(b) by 228 days.

(21) Appl. No.: 16/847,230

(22) Filed: Apr. 13, 2020

(65) Prior Publication Data

US 2021/0319131 A1    Oct. 14, 2021

(51) Int. Cl.
*G06F 21/62* (2013.01)
*H04L 9/06* (2006.01)
(Continued)

(52) U.S. Cl.
CPC ...... *G06F 21/6227* (2013.01); *G06F 16/2455* (2019.01); *G06F 16/2462* (2019.01);
(Continued)

(58) Field of Classification Search
CPC ............ G06F 21/6218; G06F 21/6227; G06F 21/6245; G06F 21/6254; G06F 16/2452;
(Continued)

(56) References Cited

U.S. PATENT DOCUMENTS 11,032,062  B2    6/2021  Salmon et al.
2013/0275743 A1*  10/2013  Jawurek .......... H04L 9/008
                                                                 713/150
(Continued)

OTHER PUBLICATIONS

Raisaro et al., Protecting Privacy and Security of Genomic Data in i2b2 with Homomorphic Encryption and Differential Privacy, IEEE, 2018.*

(Continued)

*Primary Examiner* — Minh Dinh
(74) *Attorney, Agent, or Firm* — Holland & Hart LLP

(57) ABSTRACT

Methods, systems, and devices for data processing are described. Some database systems may support differential privacy for encrypted data. For example, a database may store user data as ciphertext. A system may receive a statistical query for the user data and may identify a relevant differential privacy mechanism. The system may transform the query to operate on encrypted data while including a noisification function based on the mechanism. The system may execute the transformed query at the database, involving adding noise to the query result according to the noisification function without decrypting the data. For example, the system may leverage homomorphic encryption techniques to inject the noise while the data remains encrypted. The database may return the noisified, encrypted query results, which the system may decrypt for statistical analysis. By applying differential privacy on the encrypted data, the system may avoid exposing any private user information throughout the process.

20 Claims, 11 Drawing Sheets

(51) Int. Cl.
    *H04L 9/00*         (2022.01)
    *G06F 16/2452*     (2019.01)
    *G06F 16/2458*     (2019.01)
    *G06F 16/2455*     (2019.01)

(52) U.S. Cl.
    CPC ........ *G06F 16/24528* (2019.01); *H04L 9/008* (2013.01); *H04L 9/0618* (2013.01); *H04L 2209/08* (2013.01)

(58) Field of Classification Search
    CPC ........... G06F 16/2455; G06F 16/24528; G06F 16/2462; H04L 9/008; H04L 9/0618; H04L 2209/08
    See application file for complete search history.

(56) References Cited

U.S. PATENT DOCUMENTS

2020/0327252 A1*  10/2020  McFall .................. G06F 21/78
2021/0409197 A1*  12/2021  Baracaldo Angel ......................... G06K 9/6257

OTHER PUBLICATIONS

Yilmaz et al., Privacy-Preserving Aggregate Queries for Optimal Location Selection, IEEE, 2017.*

* cited by examiner

DIFFERENTIAL PRIVACY FOR ENCRYPTED DATA

FIELD OF TECHNOLOGY

The present disclosure relates generally to database systems and data processing, and more specifically to differential privacy for encrypted data.

BACKGROUND

Some database systems may store information related to a number of users. In some cases, this user data may include personally identifiable information (PII) or other data protected under one or more data privacy regulations. Some examples of such regulations may include the European Union's General Data Protection Regulation (GDPR), the Health Insurance Portability and Accountability Act (HIPAA) for health-related data privacy, and the Federal Trade Commission's (FTC's) data and privacy regulations for financial institutions, among other such regulations. However, despite the regulations, such user data may be extremely valuable for statistical analysis (e.g., to determine marketing campaigns, track user trends, etc.). As such, some systems or users may desire to use this user data for statistical analysis within the bounds of the privacy regulations. Further complicating such analysis, database systems may encrypt the user data at rest for data securitization. Some encryption techniques may not support statistical analysis. However, decrypting user data for statistical analysis may involve the system storing PII or other protected information as unencrypted, noise-free data (e.g., temporarily while performing one or more statistical methods). While in this unencrypted, noise-free state, a malicious user may access the data, resulting in data leakage of private user data from the database system.

DETAILED DESCRIPTION

Figure 1:
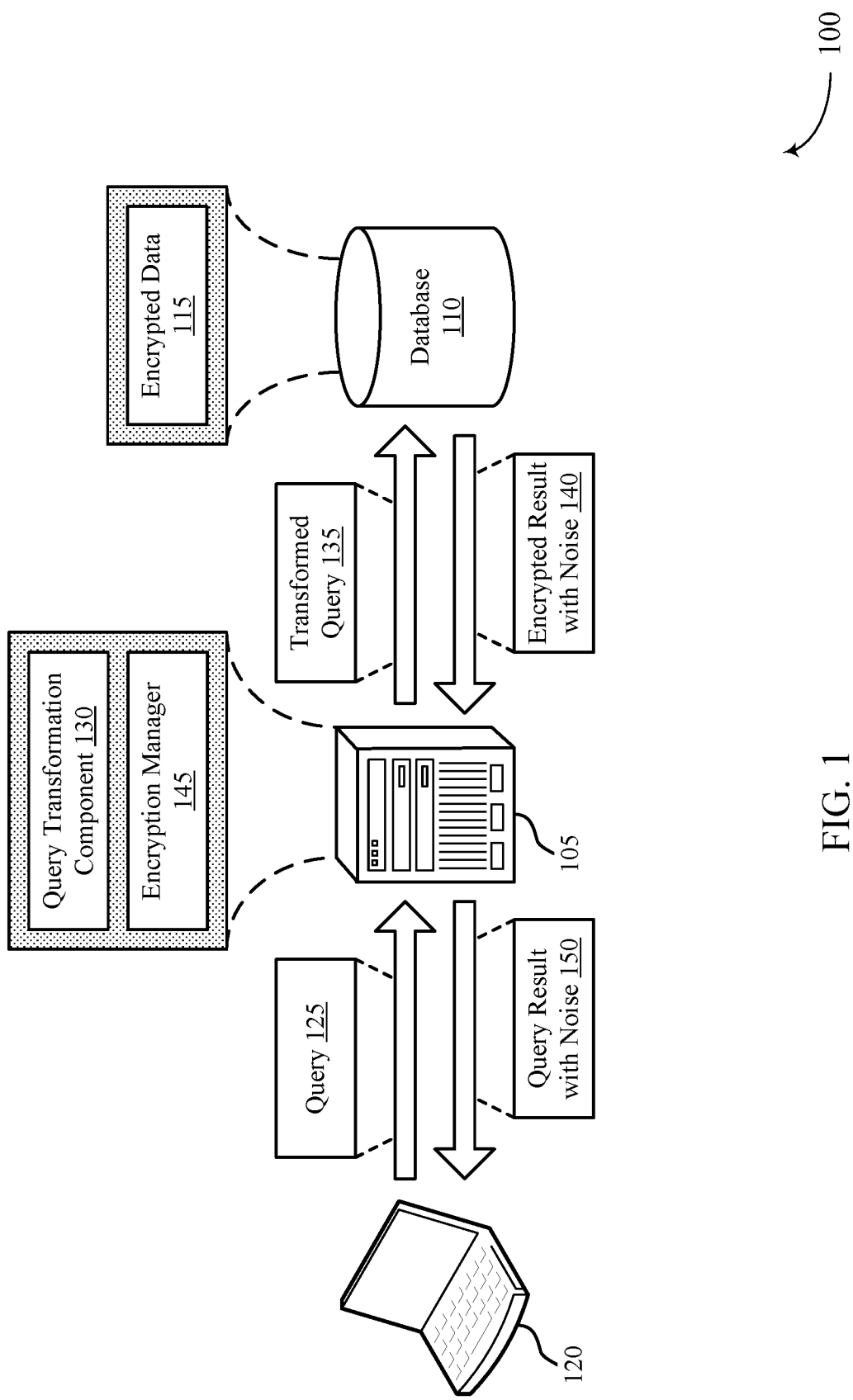
FIGS. 1 and 2 illustrate examples of systems that support differential privacy for encrypted data in accordance with aspects of the present disclosure.

A database system may store information for a number of users, including personally identifiable information (PII) or other data protected under one or more data privacy regulations. Such user data may be extremely valuable for data analytics, including statistical analysis. For example, although specific data values may be protected under the data regulations, general trends, average values, or similar statistical properties may be informative to a system or user analyzing the data (e.g., for targeting groups of users, making generalized determinations about groups of users, etc.). However, to run a statistical query on the user data in the database system, the data regulations may enforce maintaining a balance between providing accurate insights and respecting the privacy of the individual users. To support such a balance, a system may implement differential privacy as a statistical method for providing guarantees to users for bounded privacy. Differential privacy techniques may involve adding noise or sampling of user data to obfuscate any specific personal information for the users.

In some cases, the database system may secure the user information by storing the user data as encrypted at rest in a database. For example, the user data may be encrypted to ensure that the data is accessed by specific users or systems with the proper credentials and is used for specific purposes supported by legitimizing reasons (e.g., user consent or other regulations). The database may restrict other users or systems from accessing the data and may restrict requests for unauthorized usages of the data by withholding an encryption key corresponding to the encrypted data. While statistical queries on the data may be supported by the database system, temporarily decrypting the data for statistical analysis may, correspondingly, temporarily expose private user data (e.g., for potential security breaches by malicious users). For example, this data may not include noise (e.g., from one or more differential privacy techniques) upon decryption. If this data is directly accessed in any way (e.g., prior to applying differential privacy), the database system may fail to uphold one or more data regulations associated with user privacy.

To perform statistical analysis on user data while maintaining data security and supporting data regulations, a system may implement homomorphic differentially private statistical queries. The system may store user data in a database using homomorphic encryption. In some cases, a single value may be stored multiple times using multiple different homomorphic encryption techniques to support different functionality. When the system receives a statistical query for the user data, the system may identify a differential privacy mechanism applicable to the query, queried data, or both. Based on this identified differential privacy mechanism, the system may transform the query. The transformation may involve rewriting the query to target specific encrypted data in the database and to inject noise into the query results (e.g., without decrypting the data) by leveraging particular homomorphic encryption mechanisms. The system may execute the transformed query at the database to add noise into the queried data and retrieve a noisified query result including encrypted user data (e.g., ciphertext). The system may decrypt the encrypted user data to perform statistical analysis on the user data. By injecting noise into the data at query time (e.g., while the data is encrypted), the decrypted user data may already be differentially private. As such, the decryption may not expose any specific user data to potentially malicious users. Instead, by applying differential privacy on the encrypted data in the database (e.g., by leveraging specific homomorphic encryption properties), the system may support statistical analysis of user data while following data privacy regulations.

Aspects of the disclosure are initially described in the context of systems supporting differential privacy for encrypted data. Additional aspects of the disclosure are described with reference to a database configuration and a process flow. Aspects of the disclosure are further illustrated by and described with reference to apparatus diagrams, system diagrams, and flowcharts that relate to differential privacy for encrypted data.

FIG. 1 illustrates an example of a system 100 that supports differential privacy for encrypted data in accordance with aspects of the present disclosure. The system 100 may include a server 105 (e.g., a single server, a server cluster, an application server, a database server, a proxy server, a cloud-based server, a virtual machine, or any other system, service, or device supporting data processing), a database 110 (e.g., a single database, a distributed database, multiple distributed databases, a data store, an emergency backup database, or any other system supporting data storage) storing encrypted data 115, and a user device 120 (e.g., a laptop, a desktop computer, a smartphone, a server, a tablet, a sensor, or any other computing device or system capable of generating, analyzing, transmitting, or receiving communications or data). In some cases, the server 105 and the database 110 may be part of a database system. For example, the server 105 may support a service for the database system, including configuring the database 110 and providing mechanisms to support differential privacy for encrypted data 115.

The database 110 may be configured with a particular database schema. The database schema may define how data is stored at the database 110, including which encryption schemes are implemented by the database 110 to store encrypted data 115. The supported encryption schemes may include random (RND) encryption, deterministic (DET) encryption, order preserving encryption (OPE), homomorphic encryption enabling summation (HOM-SUM), homomorphic encryption enabling products (HOM-PROD), homomorphic encryption enabling token searches (SEARCH), or any combination of these or other encryption schemes. In some examples, values stored in the database 110 may be encrypted using different encryption schemes and stored multiple times in the database 110 according to the different encryption schemes (e.g., stored in different columns in a relational database). In some such examples, the database 110 may execute a query 125 on a specific column of the database 110 based on the functionality specified in the query 125. Additionally or alternatively, the database 110 may implement encryption onions, in which a single entry in the database is encrypted multiple times using different encryption schemes in layers (e.g., in a single column in a relational database). As such, the database 110 may decrypt a number of layers to reach an encryption scheme that supports a specific functionality for querying.

The database 110 may implement a server 105 to support querying operations. In some cases, the server 105 may operate as a proxy between users or systems and the database 110, where the proxy handles query transformations and encryption procedures into and out of the database 110. For example, the server 105 may transform queries and query results based on the configuration of the database 110. In some cases, the server 105 may operate transparent to an end user (e.g., a user operating the user device 120); the user device 120 may send queries 125 and receive query results as if the user device 120 is communicating directly with the database 110 (e.g., without the server 105 intercepting and modifying the query 125 and query results). The server 105 may support any number of application programming interfaces (APIs), database connectors, or both to facilitate communications between a user device 120 and the server 105 and between the server 105 and the database 110.

The user device 120 may transmit a query 125 to the database system. The query may include a request for data stored as ciphertext (e.g., encrypted data 115) at the database 110. In some cases, this query 125 may be an example of a statistical query, which also may be referred to as an analytics query. A statistical query may affect multiple values (e.g., multiple rows in a relational database, in some cases across multiple potential tables) in the database 110, where the query 125 requests for the database system to return aggregate, differentially private statistics for a set of users. To ensure that the statistical results are differentially private, the database system may inject noise into the queried user data. However, to support one or more data regulations throughout the entire querying process, the database system may transform the query to inject the noise into the user data while the data remains encrypted. In this way, the database system refrains from exposing any noise-free, plaintext data—for example, even during intermediate statistical processing—that could potentially expose PII or other protected user data to malicious users.

The server 105 may intercept—or otherwise receive—the query 125 from the user device 120 to perform the query transformation. The server 105 may include a query transformation component 130, which may be implemented in hardware, software executed by a processor, firmware, or any combination thereof. The query transformation component 130 may support a number of processes to transform a received query 125 (e.g., a structured query language (SQL) query or any other type of query) to operate according to the database 110 configuration. In some examples, the query transformation component 130 may call one or more user-defined functions (UDFs) based on the query. For statistical queries, the transformation may involve adding a noisification function to the query 125 to inject noise into the encrypted data to support differential privacy. For example, the query transformation component 130 may identify a differential privacy mechanism applicable to the query 125, the requested data, or both. The query transformation component 130 may transform the query 125 to include a noisification function based on the identified differential privacy mechanism (e.g., using one or more specific UDFs defined for the query type, the differential privacy mechanism, or both). In some examples, a noisification function may randomly determine, based on a probability, whether to provide an actual data value or a random data value. As such, for any individual data point, a user may not be able to determine whether the data point corresponds to an actual value for a user or to random noise. However, at scale, data for a total set of users may provide statistically meaningful information based on the probability used. Such a noisification function may incur a tradeoff: for example, a higher probability that any data value is random may increase user privacy but decrease the statistical relevance of the results, while a lower probability that any data value is random may increase the statistical relevance of the results while decreasing the user privacy. In some cases, the probability may be statically or dynamically selected based on the user data, one or more data regulations, the query 125, or a user input to the system 100.

Additionally or alternatively, the query transformation component 130 may transform the query 125 to operate on ciphertext (e.g., encrypted data 115) in the database 110. For example, the query transformation component 130 may encrypt plaintext values in the query 125 with the proper encryption keys and techniques to accurately search the ciphertext in the database 110. Based on the query transformation procedure, the server 105 may obtain a transformed query 135.

The server 105 may execute the transformed query 135 at the database 110. Executing the transformed query 135 may involve adding noise to a query result at the database 110 prior to—or, otherwise, without—decrypting the ciphertext at the database 110. For example, the database 110 may identify the data values of the encrypted data 115 relevant to the query (e.g., based on one or more query parameters), may determine a query result based on the identified data values, and may inject noise into the query result (e.g., at the database 110) according to the noisification function specified in the transformed query 135. This execution process may be based on the configuration of the database 110. For example, the transformed query 135 may operate on one or more specific columns of the database 110 based on the homomorphic encryption techniques used for the columns and, correspondingly, the encrypted functionality supported by the columns. Such a query execution procedure may result in a noisified query result. The noisified query result may include statistical information relevant to a set of users whose information is securely stored at the database 110. The database 110 may return the noisified query result (e.g., the encrypted result with noise 140) in response to the transformed query 135. In some cases, the server 105 may intercept—or otherwise receive—the noisified query result from the database 110 in response to the transformed query 135.

The server 105 may prepare the query results to be returned to the user device 120. For example, the server 105 may include an encryption manager 145. The encryption manager 145 may maintain an updated set of encryption keys (or identifiers supporting finding the proper encryption keys) relevant to the database 110. The encryption manager 145 may be implemented in hardware, software executed by a processor, firmware, or any combination thereof. In some examples, the encryption manager 145 may be an example or component of an external key management system for the database system. Using the encryption manager 145, the server 105 may decrypt the ciphertext in the noisified query result (e.g., the encrypted result with noise 140) to obtain plaintext for the query result. In some examples, the server 105 may perform one or more statistical methods on the obtained plaintext according to the received statistical query 125. In some other examples, the database 110, at query execution time, may perform the one or more statistical methods to obtain the query result. In any such examples, the decrypted query result at the server 105 may include the requested statistical information for the user device 120. By injecting the noise at the database 110 (e.g., at query execution time), the statistical information may uphold differential privacy upon decryption. The server 105 may send the query result with noise 150 to the user device 120 in response to the query 125. In some examples, the user device 120 may display the query result in a user interface or may otherwise perform additional analysis on the query result. Based on the noise, a user operating the user device 120 may not be able to determine reliable information for any specific user included in the statistical analysis. However, at the aggregate level, the statistical information may provide valuable insights about a set of users despite the noise.

In some other systems, statistical analysis and differential privacy are implemented on plaintext information. For example, user data relevant to statistical analysis may not be encrypted at rest, leading to security concerns within a database. In other examples, a system may decrypt data relevant to statistical analysis, inject noise into the decrypted data, and perform the requested statistical methods. However, by decrypting the data prior to injecting the noise, such a system may temporarily expose user information that is not yet differentially private, resulting in security concerns. In yet other examples, systems may not support statistical analysis on encrypted user data based on data regulations, drastically diminishing the value of such data.

In contrast, system 100 supports differential privacy for encrypted data to produce valuable insights on user data while maintaining user privacy. For example, by implementing specific query transformations and homomorphic encryption techniques as described herein, the database system may inject noise into user data without decrypting the data (e.g., while running the transformed query 135 at the database 110). As such, when the data is decrypted for sending as a query response, the data is already differentially private and does not expose any user information, even temporarily. The database system may therefore provide valuable statistical insights while supporting differential privacy and maintaining the security of private user data (e.g., according to one or more data privacy regulations) throughout the entire statistical query process. By utilizing differential privacy, the system 100 may mitigate the risk of a malicious user performing user re-identification from the statistical analysis (e.g., using one or more histograms of the statistics).

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
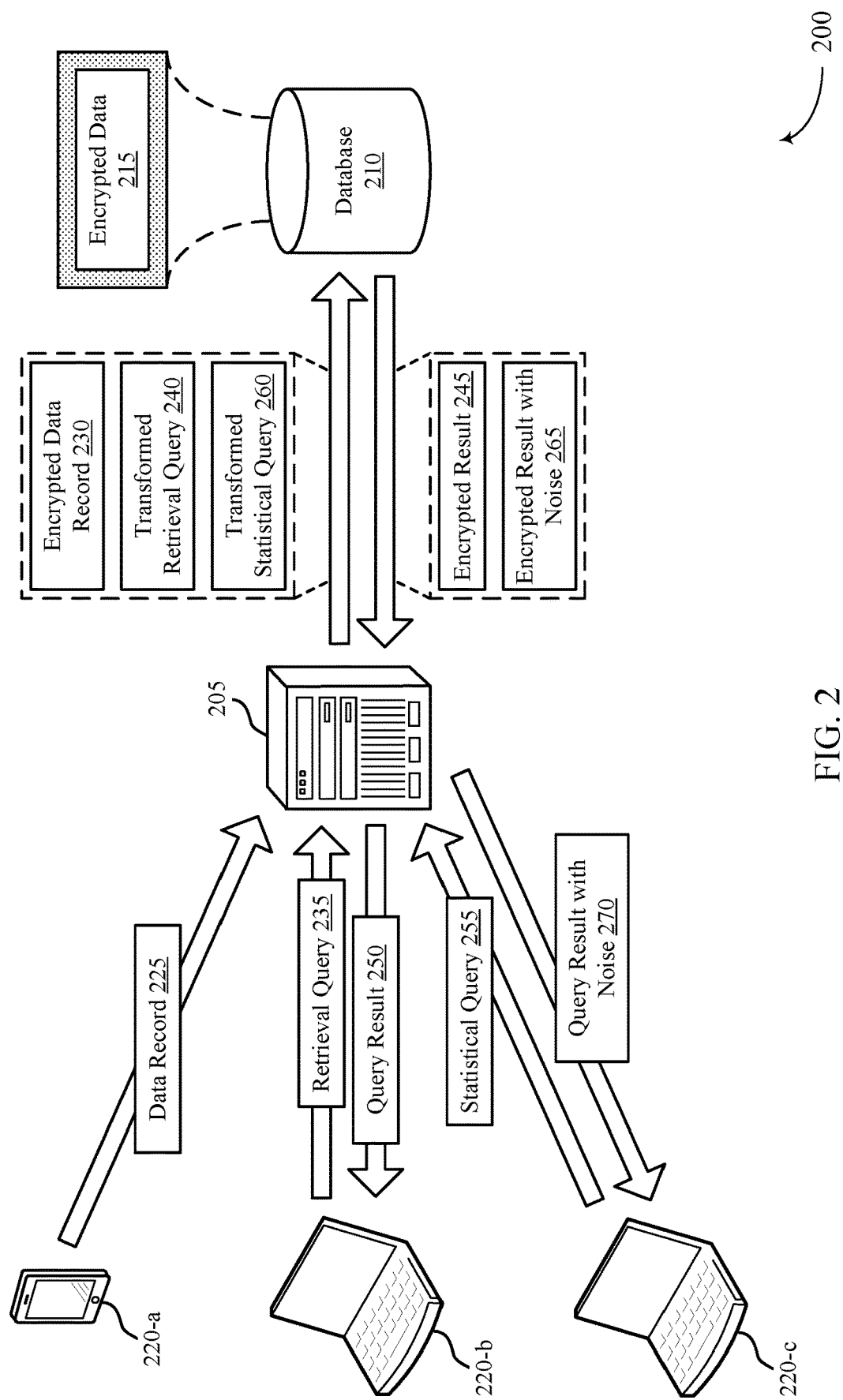

FIG. 2 illustrates an example of a system 200 that supports differential privacy for encrypted data in accordance with aspects of the present disclosure. The system 200 may be an example of a system 100 as described with reference to FIG. 1. For example, the system 200 may include a server 205, a database 210 storing encrypted data 215, and one or more user devices 220, which may be examples of the corresponding server 105, database 110 storing encrypted data 115, and user device 120 described with reference to FIG. 1. The system 200 may support handling of different types of information entering a database system (e.g., a database system including the server 205, the database 210, or both). For example, the system 200 may handle data entering the database system and different types of queries entering the database system. In some cases, the handling of the system inputs may be based on a configuration of the database 210.

In a first example, a user device 220-*a* may send a data record 225 to the database for storage. The data record 225 may be associated with a specific user and may include data covered under one or more data privacy regulations. In some cases, the data record 225 may be received based on an input from the specific user (e.g., a form submitted by the user, a product purchased by the user, etc.). In some other cases, the data record 225 may be received from another user or system collecting user data (e.g., by scraping data or otherwise collecting user data). In yet some other cases, the data record 225 may be an example of a prediction or an assertion about the specific user. The database system may check to ensure that the database system has a legitimizing reason for storing the data record 225 (e.g., in accordance with one or more data privacy regulations). If the database system has a legitimizing reason (e.g., user consent or some other reason) for storing the data record 225, the server 205 may receive the data record 225 and prepare the data record 225 for storage in the database 210.

The server 205 may encrypt the data record 225 for storage at the database 210 according to a database 210 configuration. For example, the server 205 may encrypt each data value in the data record 225 using one or more encryption techniques. In some cases, based on the type of data value, the server 205 may determine the encryption technique(s) to use. For example, for numeric values, the server 205 may implement a HOM-SUM technique for encryption in order to support summations on the encrypted numeric values (e.g., without decrypting the values). Additionally or alternatively, the server 205 may implement an OPE technique for encryption in order to support order and range operations on the encrypted numeric values. To support both order operations and summation operations, the server 205 may encrypt a same value (e.g., a numeric value) multiple times using different encryption schemes. As such, a single plaintext data value may correspond to multiple ciphertext values, where the database 210 may determine which ciphertext value to access based on what functionality to apply. Furthermore, for text values, the server 205 may implement a DET encryption technique for encryption in order to support equality operations (but not summations, as summations may not be relevant to text values). Accordingly, the server 205 may modify the data record 225 to obtain an encrypted data record 230 and may send the encrypted data record 230 to the database 210 for storage (e.g., with the encrypted data 215). The encrypted data record 230 may be stored at the database 210 noise-free (e.g., to support both retrieval queries 235 and statistical queries 255).

In a second example, a user device 220-b may send a retrieval query 235 to the database system. In some cases, the retrieval query 235 may be an example of an operational query, a user profile request, or any other query for specific user information. The server 205 may transform the retrieval query 235 to operate on the encrypted data 215 in the database 210. In some cases, the server 205 may check for permissions associated with the retrieval query 220-b. For example, the server 205 may verify whether the user device 220-b—or a user associated with the user device 220-b—is authorized to query for the specified data (e.g., in some cases, according to a specific use case for the data). In some other cases, the database 210 may check for the permissions (e.g., automatically based on the transformed retrieval query 240 or according to a database 210 policy).

The server 205 may execute the transformed retrieval query 240 at the database 210 to retrieve one or more data values. If the transformed retrieval query 240 has permission to retrieve the specified data, the database 210 may return an encrypted result 245 in response to the transformed retrieval query 240. The server 205 may decrypt the encrypted result 245 to obtain a query result 250 (e.g., in plaintext). Based on the permissions associated with the retrieval query 235, the query result 250 may not be differentially private. For example, the retrieval query 235 may be associated with a request for specific user information by the user or a system with permissioned access to the specific user information. Because the encrypted data 215 is stored noise-free, the query result 250 may include the actual data values for the specific user information. The server 205 may return the decrypted query result 250 to the user device 220-b in response to the retrieval query 235.

In contrast, in a third example, a user device 220-c may send a statistical query 255 to the database system. The server 205 may transform the statistical query 255 to operate on the encrypted data 215 in the database 210, as well as to inject noise into the encrypted data 215 (e.g., via a noisification function) based on the query being a statistical query 255. Adding noise to the query results may ensure sufficient randomization of the data underlying the statistical analysis in order to protect user privacy. For example, the injected noise may support differential privacy for the data. The server 205 may select the noisification function (e.g., a noise mechanism) based on the query type. In some cases, the server 205 or database 210 may additionally check for permissions associated with the requested statistical analysis.

The server 205 may execute the transformed statistical query 260 at the database 210 to retrieve one or more data values. If the transformed statistical query 260 has permission to retrieve the specified data for statistical analysis, the database 210 may return an encrypted result with noise 265 in response to the transformed statistical query 260. For example, based on the noisification function in the transformed statistical query 260, the database 210 may inject noise into the encrypted data 215 (e.g., at read time) to obtain an encrypted result with noise 265. In some cases, the server 205 or the database 210 may track a privacy budget during query execution. Retrieving user data for statistical analysis may consume the privacy budget. When a specific amount of user data is retrieved (e.g., for a given user, across all users, etc.), the query process may meet the privacy budget. Based on meeting the privacy budget (i.e., the privacy budget is depleted), the server 205 or the database 210 may refrain from returning additional results (e.g., for a given query, for a given user, etc.). The server 205 may decrypt the encrypted result with noise 265 to obtain a query result with noise 270 (e.g., in plaintext). As the noise is added into the encrypted data as part of the query process, the decrypted data already includes noise. This noise may support differential privacy for the decrypted data, supporting user privacy regulations. The server 205 or database 210 may perform one or more statistical methods on the data to determine a query result with noise 270 (e.g., a statistical analysis of user data stored at the database 210). The server 205 may return the decrypted query result with noise 270 to the user device 220-c in response to the statistical query 255.

Adding noise into the encrypted data 215 at query time may involve one or more processes. In some examples, the statistical query 255 may include a COUNT operation (or some other aggregation function). Adding noise to aggregate numbers may not involve encryption, since aggregate values are calculated homomorphically at the database 210. That is, an aggregate value calculated based on encrypted data 215 is itself not encrypted. As such, adding noise to such an aggregate value may not involve encrypting the noise. Instead, the database 210 may add unencrypted noise to the unencrypted aggregate value (e.g., based on the noisification function specified in the transformed statistical query 260). However, the label for such an aggregate value may be encrypted in the database 210, obfuscating the meaning of the aggregate value. The server 205 may receive, in response to the transformed statistical query 260, a noisified aggregate value with an encrypted label. The server 205 may decrypt the label to support analysis of the noisified aggregate value.

In some other examples, the statistical query 255 may include a field-level operation. In some cases, a field-level operation may be an example of a JOIN operation at a row-level in a relational database. Adding noise or weights for field-level operations may include a process performed by the database 210 (e.g., based on the noisification function specified in the transformed statistical query 260). The database 210 may add noise or weights to individual rows (e.g., fields) by creating a random noise column in the relational database. The random noise column may be a temporary column in the database 210 or may be a set of temporary relational values in the database 210. In some implementations, the database 210 may calculate this random noise column (e.g., a dedicated Laplace noise column) on-the-fly at query time. The database 210 may encrypt the random noise column using a same encryption key (e.g., a HOM-SUM encryption key) as the target data column in the database 210. The database 210 may add the random noise column to the target data column (e.g., row-by-row addition) using a homomorphic addition operation. This homomorphic addition operation may be supported based on the database 210 using the same HOM-SUM encryption key to encrypt both the random noise column and the target data column. By adding noise at the row-level (e.g., without decrypting the data), the data values in the target data column may be used for statistical analysis due to the added noise supporting differential privacy. In some cases, the server 205 or database 210 may specify the random noise function used to generate the random noise column. This random noise function may be static or dynamic (e.g., based on a user input indicating a privacy threshold, a statistical significance threshold for the statistical analysis, or some combination thereof).

In yet some other examples, the statistical query 255 may include a sampling operation. Sampling may include a GROUP BY operation on a random index column. Sampling on encrypted data 215 may not involve injecting noise into the sampling process. For example, the privacy may be supported based on the random selection procedure, which may operate on encrypted values similar to unencrypted values.

As described herein, the system 200 may implement any differential privacy mechanism on a function-by-function basis to apply to homomorphically encrypted data. For example, by using one or more UDFs, the server 205 may transform a statistical query 255 to introduce noise and combine the noise with data without decrypting the data. For example, in some cases, the database 210 may encrypt the noise homomorphically, rather than decrypt the data. By adding noise on read operations (e.g., as opposed to write operations at the database 210), the database 210 may support retrieving exact values (e.g., for a retrieval query 235) or values with a dynamic level of noise (e.g., for a statistical query 255) based on who is retrieving the data, why the data is being retrieved, or both.

Figure 3:
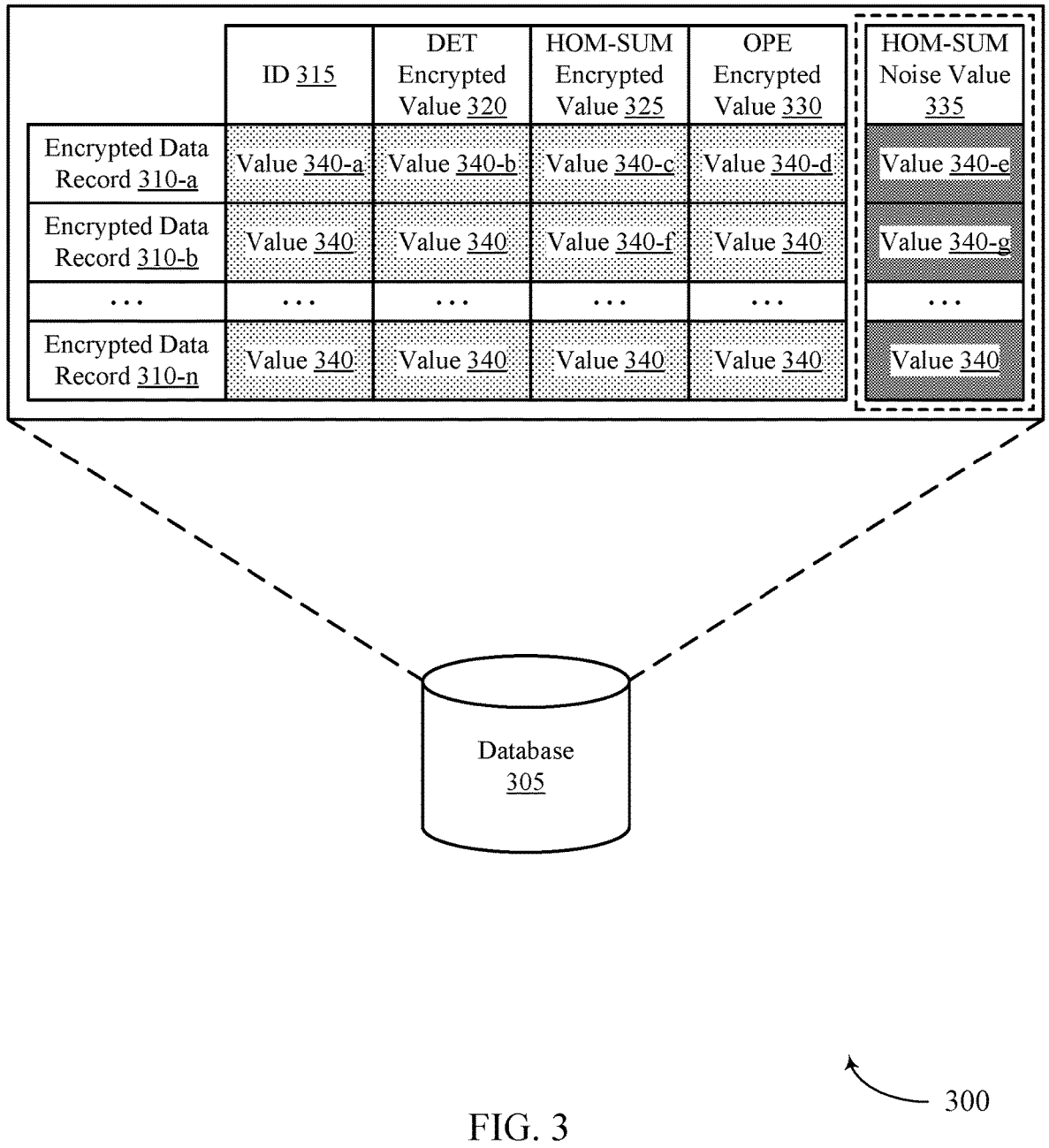
FIG. 3 illustrates an example of a database configuration that supports differential privacy for encrypted data in accordance with aspects of the present disclosure.

FIG. 3 illustrates an example of a database configuration 300 that supports differential privacy for encrypted data in accordance with aspects of the present disclosure. A database 305 may implement the database configuration 300. The database 305 may be an example of a database 110 or a database 210 as described with reference to FIGS. 1 and 2. In some cases, the database configuration 300 may be setup based on a service supporting homomorphic differentially private statistical queries. For example, the database 305 may store data according to the database configuration 300 in order to support a number of homomorphic encryption properties that enable differential privacy for encrypted data.

The database 305 may store user data, including PII. In some examples, the database 305 may store a number of data records as ciphertext (e.g., to securely store the data at rest). An encrypted data record 310 may correspond to a user. Each encrypted data record 310 may include a number of values 340 encrypted at rest. In some cases, the same plaintext value may be stored as multiple ciphertext values 340 in the database 305. In the example configuration illustrated in FIG. 3, each encrypted data record 310 may include a record identifier 315 (e.g., a user identifier) and two data values, a zip code and an age. The database configuration 300 may specify that the database 305 stores the zip code as a DET encrypted value 320 and stores the age as a HOM-SUM encrypted value 325 and as an OPE encrypted value 330. These different homomorphic techniques may support different operations on the encrypted data. As illustrated, the database 305 may store an encrypted data record 310-a, an encrypted data record 310-b, up to an encrypted data record 310-n. For the encrypted data record 310-a, the database 305 may store a ciphertext value 340-a for the record ID 315, a ciphertext value 340-b for the DET encrypted value 320 (e.g., corresponding to the zip code), a ciphertext value 340-c for the HOM-SUM encrypted value 325 (e.g., corresponding to the age), and a ciphertext value 340-d for the OPE encrypted value 330 (e.g., also corresponding to the age). The database configuration 300 is given as one example, and many other configurations (e.g., including any number of data records, fields, encryption schemes, etc.) may be implemented.

The database configuration 300 may support a number of different noise mechanisms (e.g., implementing differential privacy mechanisms to encrypted data). In a first example, the database configuration 300 may support a sensitivity-based method. The sensitivity-based method may apply a differential privacy mechanism of adding Laplace noise on aggregate data to encrypted data. A query transformation for this identified differential privacy mechanism may transform a query to apply to a DET encrypted column (e.g., the DET encrypted values 320) to support a COUNT operation. For example, the transformed query may search the DET encrypted value 320 column to determine a count for a particular value. By encrypting the search value using the same encryption key as used for the DET encrypted value 320 column, the database 305 may search the column without decrypting the data (e.g., based on the column using DET encryption). The database 305 may inject Laplace noise on the count value, which is not encrypted. For example, the query may request a count of users with the zip code "20001." The transformed query may search for a DET encrypted ciphertext value corresponding to the plaintext value "20001" in the DET encrypted value 320 column and may sum the total identified. The database 305 may inject Laplace noise to this calculated total to support the differential privacy mechanism.

In a second example, the database configuration 300 may support a row-level Laplace noise method. The row-level Laplace noise method may apply to multiple differential privacy mechanisms (e.g., in combination with one or more other approaches). A query transformation for such identified differential privacy mechanisms may transform a query to apply to a HOM-SUM encrypted column (e.g., the HOM-SUM encrypted values 325) to add noise at the field level. To add the noise, the database 305 may generate a random noise column (or, similarly, a set of relational values corresponding to random noise). In some examples, such a column may be referred to as a dedicated Laplace noise column. The database 305 may encrypt this noise column with the same HOM-SUM encryption key as the HOM-SUM encrypted column, resulting in a column of HOM-SUM encrypted noise values 335. In some examples, the noise column generation, noise column encryption, or both may be performed at query time. The database 305 may add the HOM-SUM encrypted noise value 335 column to the HOM-SUM encrypted value 325 column to inject the noise into the encrypted data. This addition may be an example of row-level (e.g., field-level) homomorphic encryption. For example, the database 305 may homomorphically add ciphertext value 340-*e* to ciphertext value 340-*c* and may separately add ciphertext value 340-*g* to ciphertext value 340-*f*.

In a third example, the database configuration 300 may support a weighted privacy integrated query (PINQ) method. The weighted PINQ method may support differential privacy mechanisms implementing joins. The query transformation and database 305 operations supporting the weighted PINQ method may be similar to the query transformation and database 305 operations supporting the row-level Laplace noise method (e.g., adding random weights in a similar manner to adding Laplace noise).

In a fourth example, the database configuration 300 may support a sample and aggregate method. The sample and aggregate method may support a number of differential privacy mechanisms (e.g., mechanisms not implementing joins). A query transformation for such differential privacy mechanisms may transform a query to apply to a DET encrypted column (e.g., the DET encrypted values 320) to support a sample operation. If aggregating data, the query transformation for such differential privacy mechanisms may transform the query to apply to a HOM-SUM encrypted column (e.g., the HOM-SUM encrypted values 325) to aggregate values. Noise may be added at the field level or at the aggregate level. If aggregating data according to a particular range or set of characteristics (e.g., aggregating on quantiles), the query transformation may transform the query to apply to an OPE encrypted column (e.g., the OPE encrypted values 330) to determine quantiles.

Accordingly, the database 305 may execute transformed queries to generate and return noisified, encrypted query results (e.g., according to any supported differential privacy mechanisms on a function-by-function basis).

Figure 4:
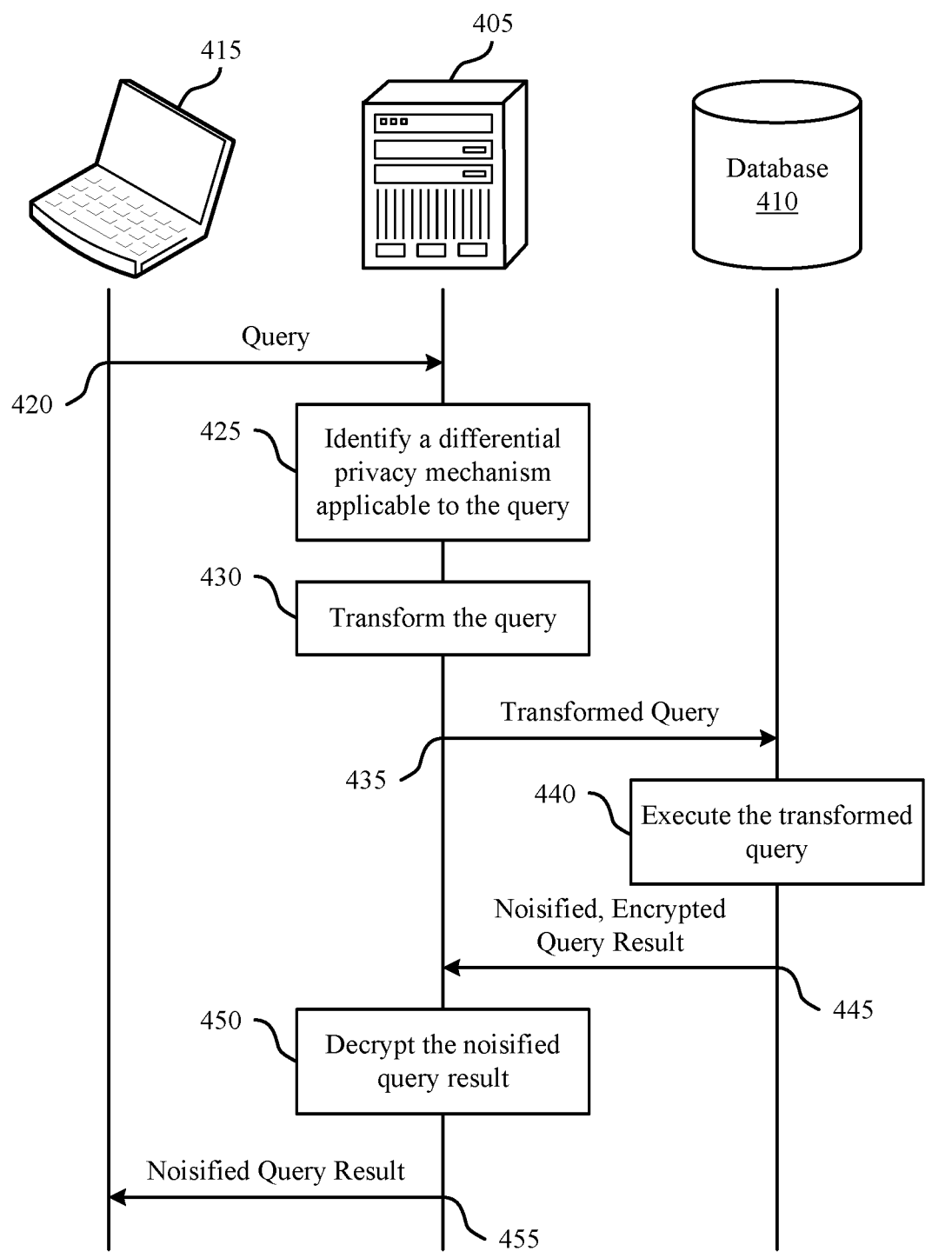
FIG. 4 illustrates an example of a process flow that supports differential privacy for encrypted data in accordance with aspects of the present disclosure.

FIG. 4 illustrates an example of a process flow 400 that supports differential privacy for encrypted data in accordance with aspects of the present disclosure. The process flow 400 may be implemented by a system 100 or 200 as described with reference to FIGS. 1 and 2. In some cases, a server 405 and a database 410 may be aspects of a database system, where the database 410 may be configured according to a database configuration 300 as described with reference to FIG. 3. A user device 415 may query the database system for statistical information, and the database system may implement differential privacy for encrypted data to provide insights while maintaining user privacy. Alternative examples of the following may be implemented, where some steps are performed in a different order than described or are not performed at all. In some cases, steps may include additional features not mentioned below, or further steps may be added.

At 420, the server 405 may receive, from an application (e.g., an application running at the user device 415), a query including a request for data stored as ciphertext at the database 410. In some examples, the query may be an example of a statistical query.

At 425, the server 405 may identify a differential privacy mechanism applicable to the query, the data, or both. At 430, the server 405 may transform the query to include a noisification function based on the differential privacy mechanism. The noisification function may be an example of a process defined within the transformed query statement specifying one or more data modifications. Such data modifications may inject noise into a query result (e.g., into an aggregate value or at a field-level) to support differential privacy. In some examples, the server 405 may perform one or more calls to one or more UDFs based on the query, the differential privacy mechanism, or both in order to perform the query transformation.

At 435, the server 405 may send the transformed query to the database 410. At 440, the database 410 may execute the transformed query. Executing the transformed query may involve adding noise to a query result at the database 410 prior to decrypting the ciphertext (e.g., without decrypting the ciphertext at the database 410) to obtain a noisified query result according to the noisification function. Such a query execution process may allow the database 410 to refrain from handling a plaintext value of the data in the database by injecting the noise directly into ciphertext using homomorphic encryption techniques (e.g., based on adding the noise to the query result at the database prior to decrypting the ciphertext). In some examples, the server 405 or the database 410 may determine a level of noise for the noisification function based on a preference of the owner of the data, a user identifier associated with the query (e.g., for a user operating the user device 415), an analytics operation associated with the query, or a combination thereof.

At 445, the server 405 may receive, from the database 410 and in response to the transformed query, the noisified query result including the ciphertext based on executing the transformed query. At 450, the server 405 may decrypt the ciphertext for the noisified query result (e.g., external to the database 410). In some examples, the server 405 may perform one or more statistical operations on the decrypted noisified query result based on the statistical query. In some other examples, the database 410 may perform the one or more statistical operations on the noisified query result (e.g., while the data is still encrypted) using one or more homomorphic functions. In any such examples, the server 405 may determine decrypted statistical results for the query, where the user data is differentially private based on the added noise at query time. At 455, the server 405 may transmit, to the application and in response to the query, the noisified query result including the decrypted ciphertext (e.g., the decrypted statistical results for the query).

Figure 5:
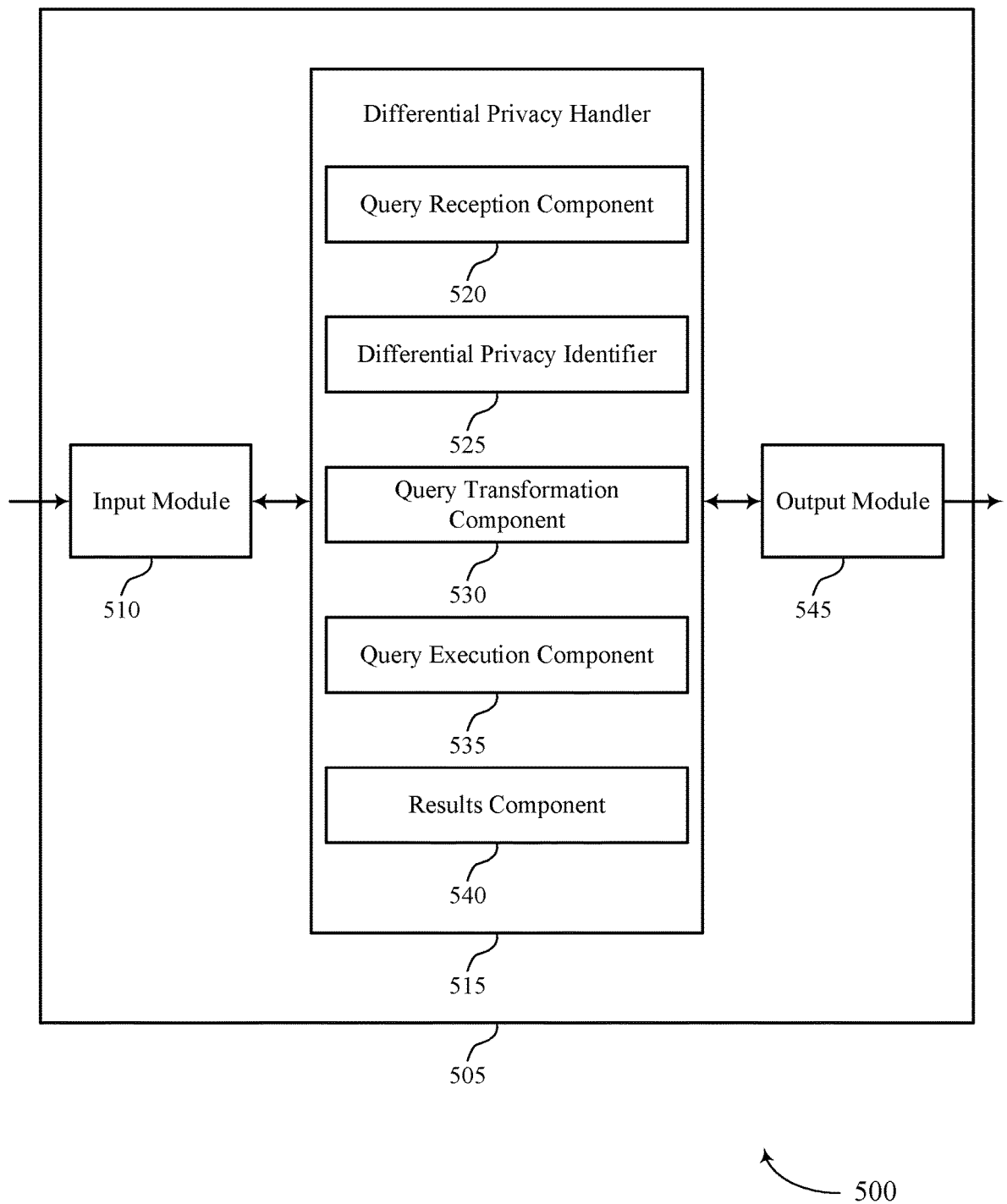
FIG. 5 shows a block diagram of an apparatus that supports differential privacy for encrypted data in accordance with aspects of the present disclosure.

FIG. 5 shows a block diagram 500 of an apparatus 505 that supports differential privacy for encrypted data in accordance with aspects of the present disclosure. The apparatus 505 may include an input module 510, a differential privacy handler 515, and an output module 545. The apparatus 505 may also include a processor. Each of these components may be in communication with one another (e.g., via one or more buses). In some cases, the apparatus 505 may be an example of a user terminal, a database server, or a system containing multiple computing devices.

The input module 510 may manage input signals for the apparatus 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the apparatus 505 for processing. For example, the input module 510 may transmit input signals to the differential privacy handler 515 to support differential privacy for encrypted data. In some cases, the input module 510 may be a component of an input/output (I/O) controller 715 as described with reference to FIG. 7.

The differential privacy handler 515 may include a query reception component 520, a differential privacy identifier 525, a query transformation component 530, a query execution component 535, and a results component 540. The differential privacy handler 515 may be an example of aspects of the differential privacy handler 605 or 710 described with reference to FIGS. 6 and 7.

The differential privacy handler 515 and/or at least some of its various sub-components may be implemented in hardware, software executed by a processor, firmware, or any combination thereof. If implemented in software executed by a processor, the functions of the differential privacy handler 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The differential privacy handler 515 and/or at least some of its various sub-components may be physically located at various positions, including being distributed such that portions of functions are implemented at different physical locations by one or more physical devices. In some examples, the differential privacy handler 515 and/or at least some of its various sub-components may be a separate and distinct component in accordance with various aspects of the present disclosure. In other examples, the differential privacy handler 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The query reception component 520 may receive, from an application, a query including a request for data stored as ciphertext at a database. The differential privacy identifier 525 may identify a differential privacy mechanism applicable to the query, the data, or both. The query transformation component 530 may transform the query to include a noisification function based on the differential privacy mechanism.

The query execution component 535 may execute the transformed query at the database, where the executing involves adding noise to a query result at the database prior to decrypting the ciphertext to obtain a noisified query result according to the noisification function. The results component 540 may receive, from the database and in response to the transformed query, the noisified query result including the ciphertext based on executing the transformed query.

The output module 545 may manage output signals for the apparatus 505. For example, the output module 545 may receive signals from other components of the apparatus 505, such as the differential privacy handler 515, and may transmit these signals to other components or devices. In some specific examples, the output module 545 may transmit output signals for display in a user interface, for storage in a database or data store, for further processing at a server or server cluster, or for any other processes at any number of devices or systems. In some cases, the output module 545 may be a component of an I/O controller 715 as described with reference to FIG. 7.

Figure 6:
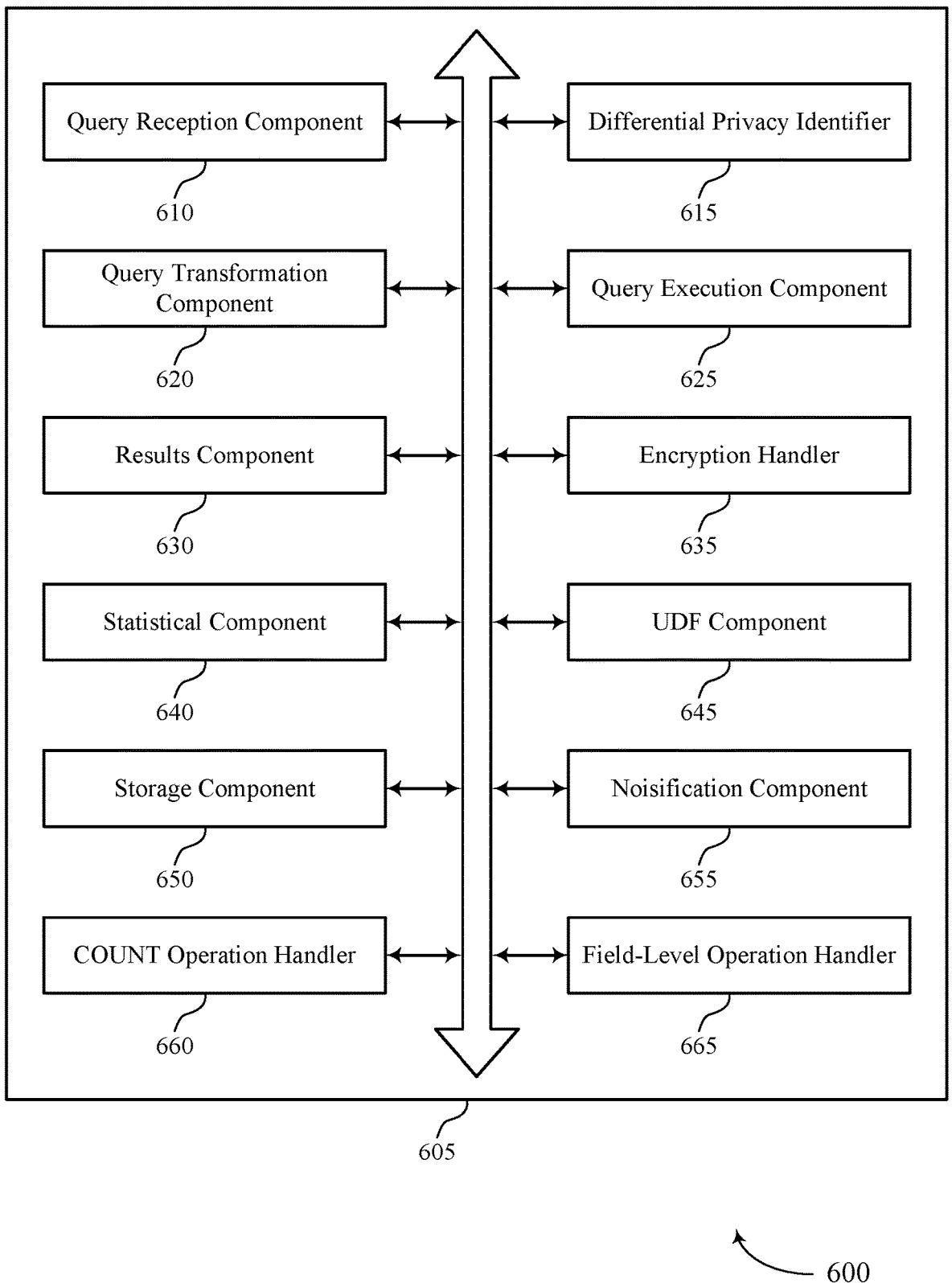
FIG. 6 shows a block diagram of a differential privacy handler that supports differential privacy for encrypted data in accordance with aspects of the present disclosure.

FIG. 6 shows a block diagram 600 of a differential privacy handler 605 that supports differential privacy for encrypted data in accordance with aspects of the present disclosure. The differential privacy handler 605 may be an example of aspects of a differential privacy handler 515 or a differential privacy handler 710 described herein. The differential privacy handler 605 may include a query reception component 610, a differential privacy identifier 615, a query transformation component 620, a query execution component 625, a results component 630, an encryption handler 635, a statistical component 640, a UDF component 645, a storage component 650, a noisification component 655, a COUNT operation handler 660, a field-level operation handler 665, or any combination of these or additional components. Each of these components may communicate, directly or indirectly, with one another (e.g., via one or more buses).

The query reception component 610 may receive, from an application, a query including a request for data stored as ciphertext at a database. The differential privacy identifier 615 may identify a differential privacy mechanism applicable to the query, the data, or both. The query transformation component 620 may transform the query to include a noisification function based on the differential privacy mechanism.

The query execution component 625 may execute the transformed query at the database, where the executing involves adding noise to a query result at the database (e.g., prior to decrypting the ciphertext) to obtain a noisified query result according to the noisification function. The results component 630 may receive, from the database and in response to the transformed query, the noisified query result including the ciphertext based on executing the transformed query.

In some examples, the encryption handler 635 may decrypt the ciphertext for the noisified query result. In some such examples, the results component 630 may transmit, to the application and in response to the query, the noisified query result including the decrypted ciphertext. In some cases, the ciphertext for the noisified query result is decrypted external to the database.

In some cases, the query may be an example of a statistical query, and the statistical component 640 may perform one or more statistical operations on the noisified query result based on the decrypted ciphertext and the statistical query.

The UDF component 645 may perform one or more calls to one or more UDFs based on the query, the differential privacy mechanism, or both.

In some examples, the encryption handler 635 may encrypt the data to obtain the ciphertext. In some such examples, the storage component 650 may store the ciphertext at the database, where the stored ciphertext is noise-free.

In some cases, the query may be associated with an analytics operation and the differential privacy mechanism may be identified based on the analytics operation. Additionally, the query reception component 610 may receive, from a second application, a second query including a second request for at least a portion of the data, where the second query may be associated with a permissioned user request. In some examples, the query execution component 625 may execute the second query at the database to obtain a query result including second ciphertext associated with the portion of the data. The results component 630 may receive, from the database and in response to the second query, the query result including the second ciphertext based on executing the second query, and the encryption handler 635 may decrypt the second ciphertext for the query result to obtain the portion of the data, where the portion of the data is noise-free based on the storing and the second query being associated with the permissioned user request. In some examples, the results component 630 may transmit, to the second application and in response to the second query, the portion of the data.

In some cases, the noisification function may be associated with a level of noise, and the noisification component 655 may determine the level of noise for the noisification function based on a preference of an owner of the data, a user identifier associated with the query, an analytics operation associated with the query, or a combination thereof.

In some examples, the query may include a COUNT operation. In some such examples, adding the noise to the query result at the database may include a number of processes performed by a COUNT operation handler 660. For example, the COUNT operation handler 660 may calculate one or more aggregate values based on the ciphertext and the COUNT operation, where each aggregate value of the one or more aggregate values is associated with a corresponding ciphertext label, and may determine one or more noise values. In some examples, the COUNT operation handler 660 may add the one or more noise values to at least one of the one or more aggregate values to obtain one or more noisified aggregate values, where the noisified query result includes the one or more noisified aggregate values and where each noisified aggregate value of the one or more noisified aggregate values is associated with the corresponding ciphertext label.

In some examples, the query may include a field-level operation. In some such examples, adding the noise to the query result at the database may include a number of processes performed by a field-level operation handler 665. For example, the field-level operation handler 665 may identify a set of encrypted fields in the database including the ciphertext, where the ciphertext is encrypted according to a homomorphic encryption key, and may determine a set of noise values, where each noise value of the set of noise values corresponds to a respective field of the set of fields. In some examples, the field-level operation handler 665 may encrypt the set of noise values using the homomorphic encryption key and may add the set of encrypted noise values to the set of encrypted fields based on the field-level operation to obtain a set of noisified encrypted field values, where the noisified query result includes the set of noisified encrypted field values. In some cases, the database may be a relational database, the field-level operation may be an example of a row-level operation, a JOIN operation, or a combination thereof in the relational database, and the set of encrypted fields may correspond to a column in the relational database.

In some cases, the database may be a relational database, and the data may be stored as first ciphertext in a first column of the relational database and as second ciphertext in a second column of the relational database, where the first ciphertext is encrypted according to a first homomorphic encryption method and the second ciphertext is encrypted according to a second homomorphic encryption method different from the first homomorphic encryption method. In some examples, the query execution component 625 may determine to use the first column for executing the transformed query based on the first homomorphic encryption method supporting the differential privacy mechanism.

In some examples, the results component 630 may refrain from handling a plaintext version of the data in the database based on adding the noise to the query result at the database prior to decrypting the ciphertext.

Figure 7:
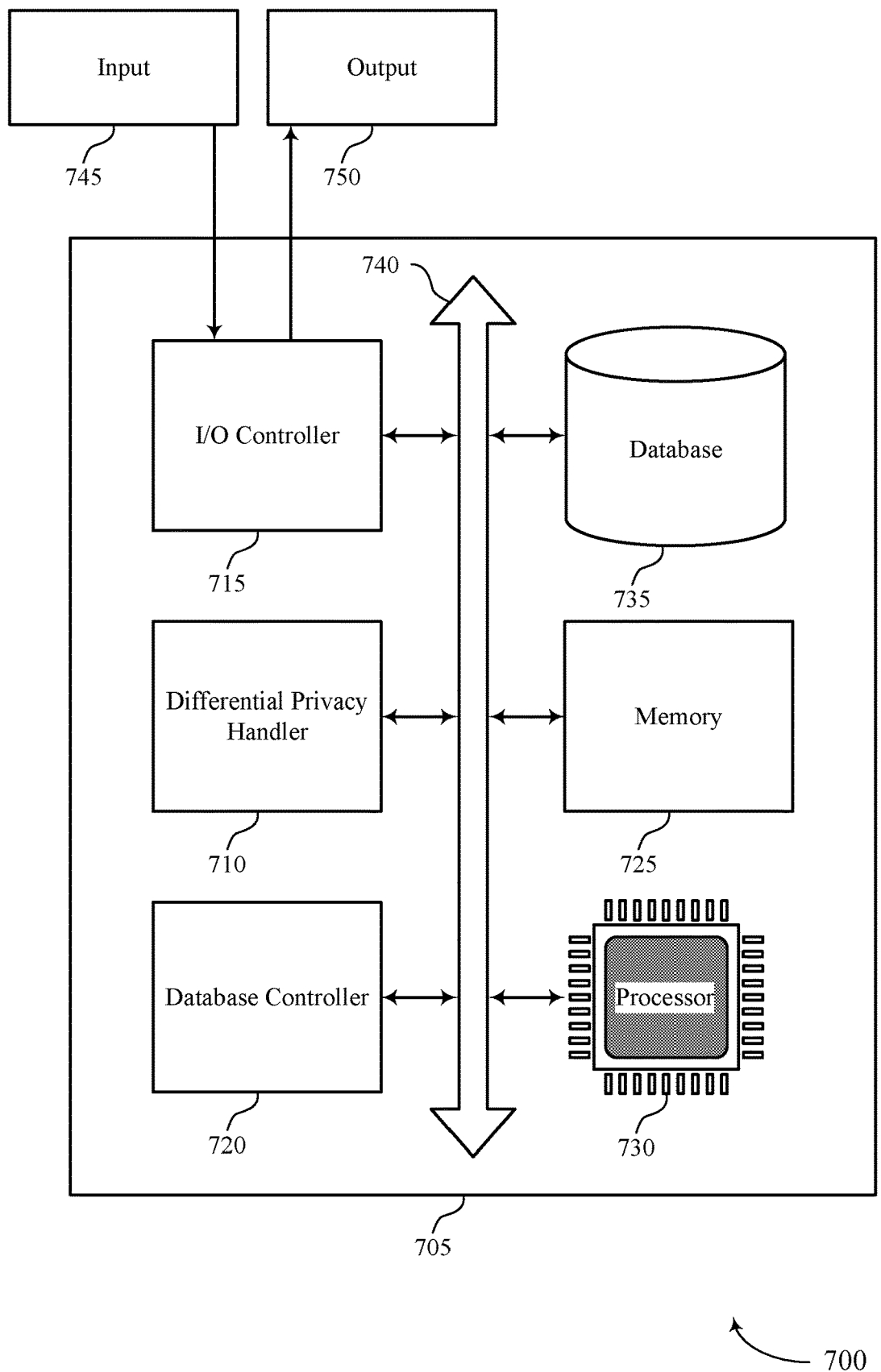
FIG. 7 shows a diagram of a system including a device that supports differential privacy for encrypted data in accordance with aspects of the present disclosure.

FIG. 7 shows a diagram of a system 700 including a device 705 that supports differential privacy for encrypted data in accordance with aspects of the present disclosure. The device 705 may be an example of or include the components of an application server (e.g., a single server, a server cluster, a database server, a proxy server, a cloud-based server, a virtual machine, a container, or any other device or system supporting data processing) or an apparatus 505 as described herein. The device 705 may include components for bi-directional data communications including components for transmitting and receiving communications, including a differential privacy handler 710, an I/O controller 715, a database controller 720, memory 725, a processor 730, and a database 735. These components may be in electronic communication via one or more buses (e.g., bus 740).

The differential privacy handler 710 may be an example of a differential privacy handler 515 or 605 as described herein. For example, the differential privacy handler 710 may perform any of the methods or processes described above with reference to FIGS. 5 and 6. In some cases, the differential privacy handler 710 may be implemented in hardware, software executed by a processor, firmware, or any combination thereof.

The I/O controller 715 may manage input signals 745 and output signals 750 for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The database controller 720 may manage data storage and processing in a database 735. In some cases, a user may interact with the database controller 720. In other cases, the database controller 720 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor to perform various functions described herein. In some cases, the memory 725 may contain, among other things, a basic I/O system (BIOS) which may control basic hardware or software operation such as the interaction with peripheral components or devices.

The processor 730 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting differential privacy for encrypted data).

Figure 8:
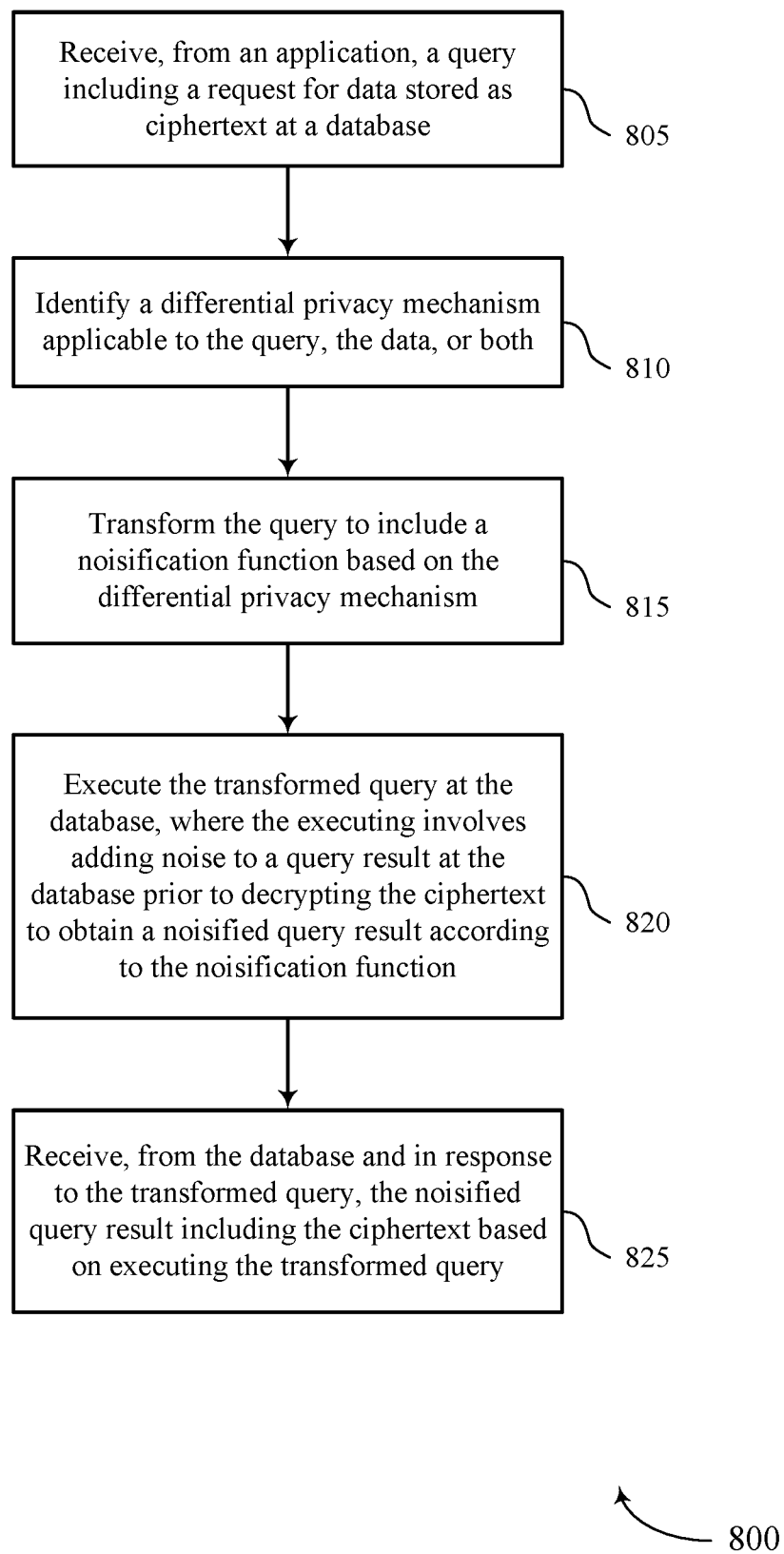
FIGS. 8 through 11 show flowcharts illustrating methods that support differential privacy for encrypted data in accordance with aspects of the present disclosure.

FIG. 8 shows a flowchart illustrating a method 800 that supports differential privacy for encrypted data in accordance with aspects of the present disclosure. The operations of method 800 may be implemented by an application server (e.g., a single server, a server cluster, a database server, a proxy server, a cloud-based server, a virtual machine, a container, or any other device or system supporting data processing) or its components as described herein. For example, the operations of method 800 may be performed by a differential privacy handler as described with reference to FIGS. 5 through 7. In some examples, an application server may execute a set of instructions to control the functional elements of the application server to perform the functions described below. Additionally or alternatively, an application server may perform aspects of the functions described below using special-purpose hardware.

At 805, the application server may receive, from an application, a query including a request for data stored as ciphertext at a database. The operations of 805 may be performed according to the methods described herein. In some examples, aspects of the operations of 805 may be performed by a query reception component as described with reference to FIGS. 5 through 7.

At 810, the application server may identify a differential privacy mechanism applicable to the query, the data, or both. The operations of 810 may be performed according to the methods described herein. In some examples, aspects of the operations of 810 may be performed by a differential privacy identifier as described with reference to FIGS. 5 through 7.

At 815, the application server may transform the query to include a noisification function based on the differential privacy mechanism. The operations of 815 may be performed according to the methods described herein. In some examples, aspects of the operations of 815 may be performed by a query transformation component as described with reference to FIGS. 5 through 7.

At 820, the application server may execute the transformed query at the database. Executing the transformed query may involve adding noise to a query result at the database prior to decrypting the ciphertext to obtain a noisified query result according to the noisification function. The operations of 820 may be performed according to the methods described herein. In some examples, aspects of the operations of 820 may be performed by a query execution component as described with reference to FIGS. 5 through 7.

At 825, the application server may receive, from the database and in response to the transformed query, the noisified query result including the ciphertext based on executing the transformed query. The operations of 825 may be performed according to the methods described herein. In some examples, aspects of the operations of 825 may be performed by a results component as described with reference to FIGS. 5 through 7.

Figure 9:
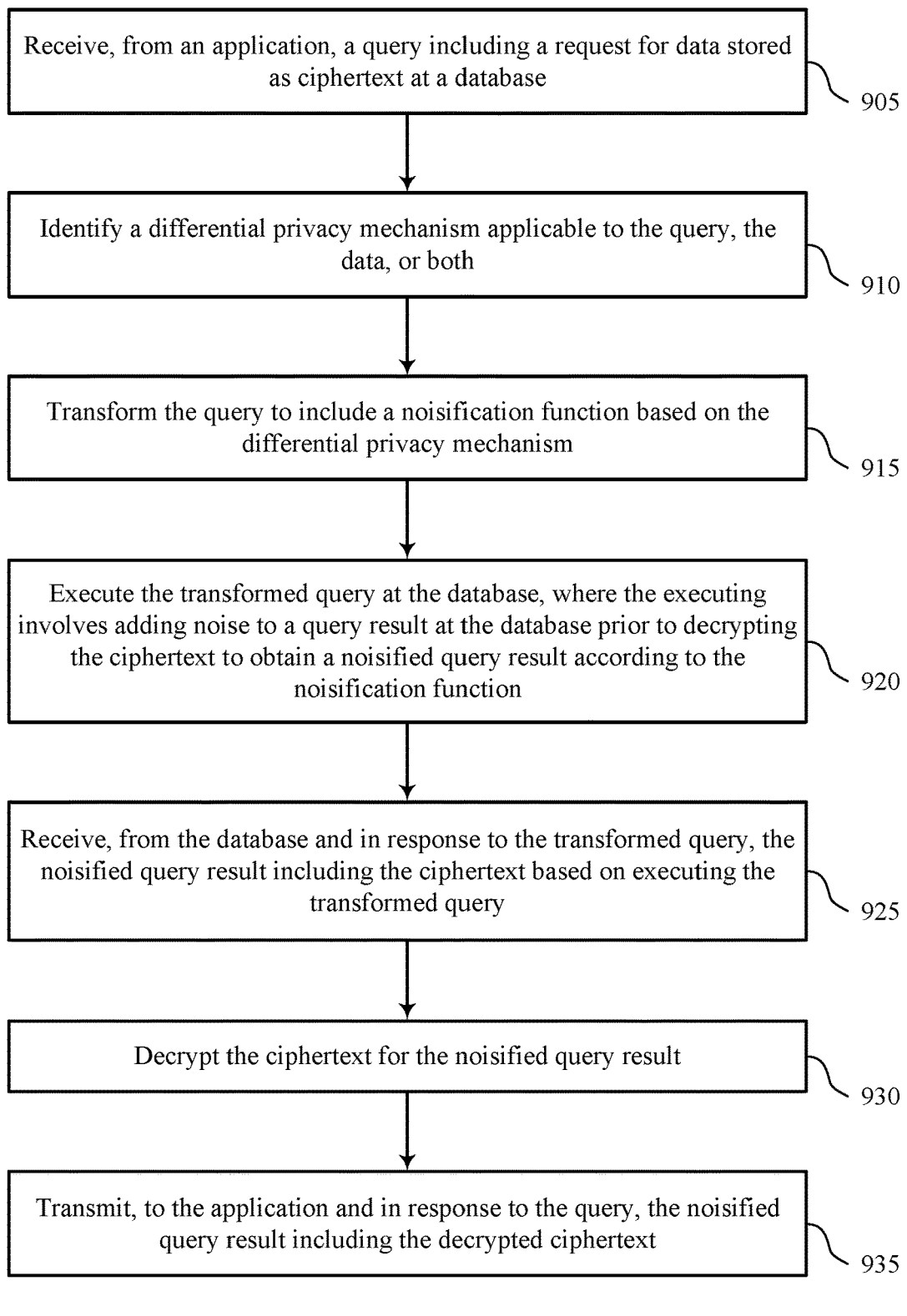

FIG. 9 shows a flowchart illustrating a method 900 that supports differential privacy for encrypted data in accordance with aspects of the present disclosure. The operations of method 900 may be implemented by an application server or its components as described herein. For example, the operations of method 900 may be performed by a differential privacy handler as described with reference to FIGS. 5 through 7. In some examples, an application server may execute a set of instructions to control the functional elements of the application server to perform the functions described below. Additionally or alternatively, an application server may perform aspects of the functions described below using special-purpose hardware.

At 905, the application server may receive, from an application, a query including a request for data stored as ciphertext at a database. The operations of 905 may be performed according to the methods described herein. In some examples, aspects of the operations of 905 may be performed by a query reception component as described with reference to FIGS. 5 through 7.

At 910, the application server may identify a differential privacy mechanism applicable to the query, the data, or both. The operations of 910 may be performed according to the methods described herein. In some examples, aspects of the operations of 910 may be performed by a differential privacy identifier as described with reference to FIGS. 5 through 7.

At 915, the application server may transform the query to include a noisification function based on the differential privacy mechanism. The operations of 915 may be performed according to the methods described herein. In some examples, aspects of the operations of 915 may be performed by a query transformation component as described with reference to FIGS. 5 through 7.

At 920, the application server may execute the transformed query at the database, where the executing may involve adding noise to a query result at the database prior to decrypting the ciphertext to obtain a noisified query result according to the noisification function. The operations of 920 may be performed according to the methods described herein. In some examples, aspects of the operations of 920 may be performed by a query execution component as described with reference to FIGS. 5 through 7.

At 925, the application server may receive, from the database and in response to the transformed query, the noisified query result including the ciphertext based on executing the transformed query. The operations of 925 may be performed according to the methods described herein. In some examples, aspects of the operations of 925 may be performed by a results component as described with reference to FIGS. 5 through 7.

At 930, the application server may decrypt the ciphertext for the noisified query result. The operations of 930 may be performed according to the methods described herein. In some examples, aspects of the operations of 930 may be performed by an encryption handler as described with reference to FIGS. 5 through 7.

At 935, the application server may transmit, to the application and in response to the query, the noisified query result including the decrypted ciphertext. The operations of 935 may be performed according to the methods described herein. In some examples, aspects of the operations of 935 may be performed by a results component as described with reference to FIGS. 5 through 7.

Figure 10:
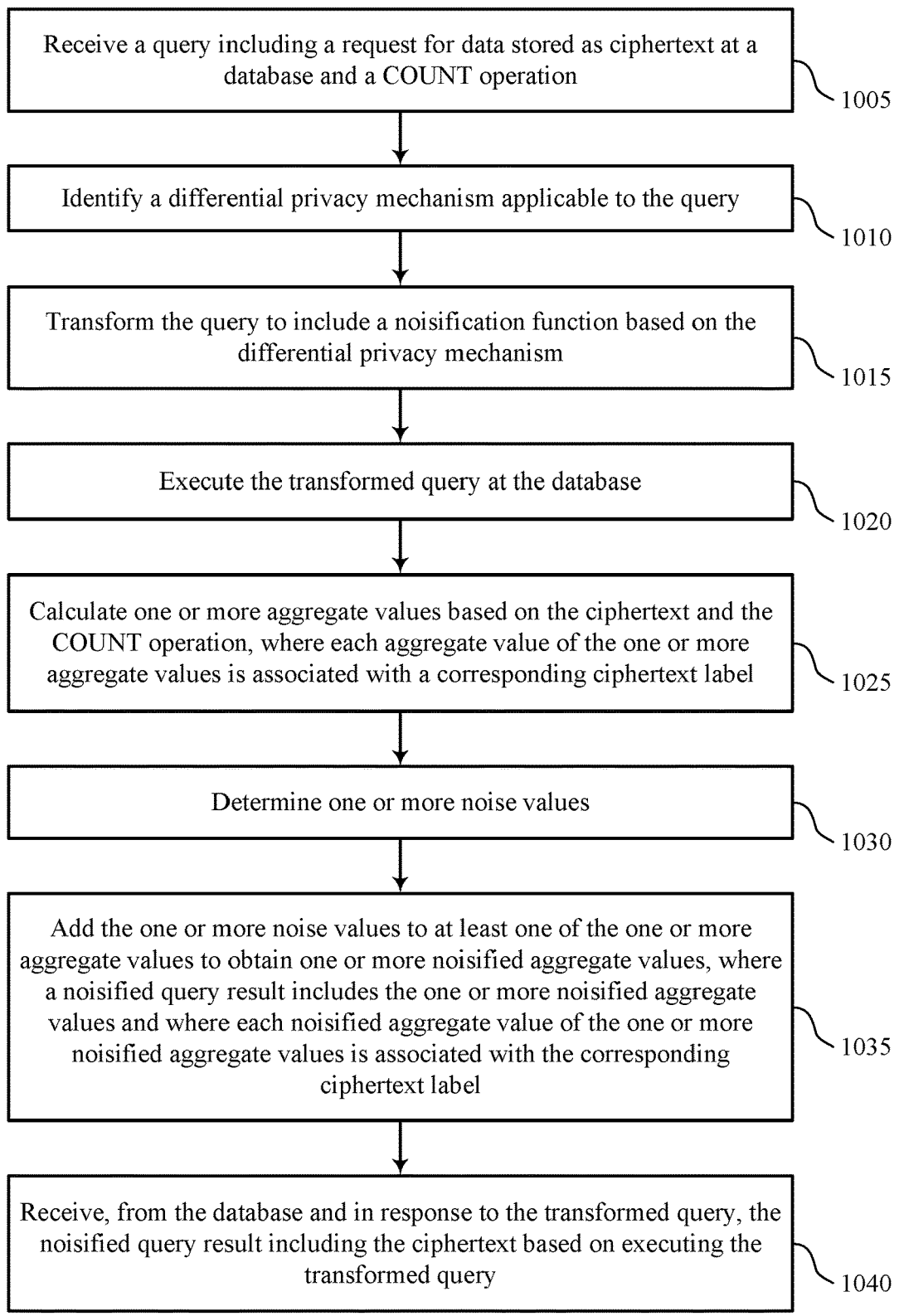

FIG. 10 shows a flowchart illustrating a method 1000 that supports differential privacy for encrypted data in accordance with aspects of the present disclosure. The operations of method 1000 may be implemented by an application server or its components as described herein. For example, the operations of method 1000 may be performed by a differential privacy handler as described with reference to FIGS. 5 through 7. In some examples, an application server may execute a set of instructions to control the functional elements of the application server to perform the functions described below. Additionally or alternatively, an application server may perform aspects of the functions described below using special-purpose hardware.

At 1005, the application server may receive, from an application, a query including a request for data stored as ciphertext at a database. The query may include a COUNT operation. The operations of 1005 may be performed according to the methods described herein. In some examples, aspects of the operations of 1005 may be performed by a query reception component as described with reference to FIGS. 5 through 7.

At 1010, the application server may identify a differential privacy mechanism applicable to the query, the data, or both. The operations of 1010 may be performed according to the methods described herein. In some examples, aspects of the operations of 1010 may be performed by a differential privacy identifier as described with reference to FIGS. 5 through 7.

At 1015, the application server may transform the query to include a noisification function based on the differential privacy mechanism. The operations of 1015 may be performed according to the methods described herein. In some examples, aspects of the operations of 1015 may be performed by a query transformation component as described with reference to FIGS. 5 through 7.

At 1020, the application server may execute the transformed query at the database. Executing the transformed query may involve adding noise to a query result at the database prior to decrypting the ciphertext to obtain a noisified query result according to the noisification function. The noise may be added according to 1025, 1030, and 1035. The operations of 1020 may be performed according to the methods described herein. In some examples, aspects of the operations of 1020 may be performed by a query execution component as described with reference to FIGS. 5 through 7.

At 1025, the application server may calculate one or more aggregate values based on the ciphertext and the COUNT operation, where each aggregate value of the one or more aggregate values is associated with a corresponding ciphertext label. The operations of 1025 may be performed according to the methods described herein. In some examples, aspects of the operations of 1025 may be performed by a COUNT operation handler as described with reference to FIGS. 5 through 7.

At 1030, the application server may determine one or more noise values. The operations of 1030 may be performed according to the methods described herein. In some examples, aspects of the operations of 1030 may be performed by a COUNT operation handler as described with reference to FIGS. 5 through 7.

At 1035, the application server may add the one or more noise values to at least one of the one or more aggregate values to obtain one or more noisified aggregate values, where the noisified query result includes the one or more noisified aggregate values and where each noisified aggregate value of the one or more noisified aggregate values is associated with the corresponding ciphertext label. The operations of 1035 may be performed according to the methods described herein. In some examples, aspects of the operations of 1035 may be performed by a COUNT operation handler as described with reference to FIGS. 5 through 7.

At 1040, the application server may receive, from the database and in response to the transformed query, the noisified query result including the ciphertext based on executing the transformed query. The operations of 1040 may be performed according to the methods described herein. In some examples, aspects of the operations of 1040 may be performed by a results component as described with reference to FIGS. 5 through 7.

Figure 11:
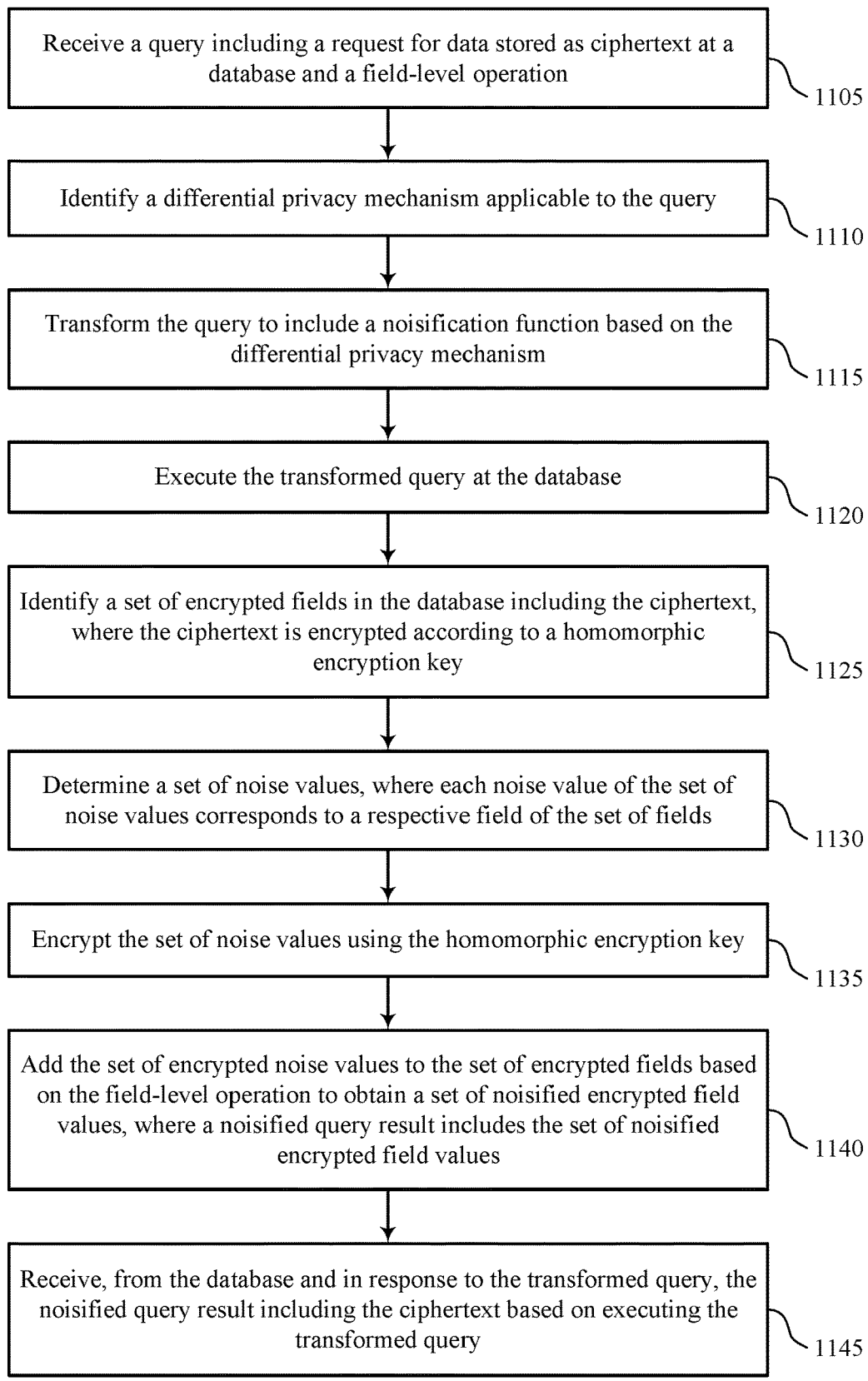

FIG. 11 shows a flowchart illustrating a method 1100 that supports differential privacy for encrypted data in accordance with aspects of the present disclosure. The operations of method 1100 may be implemented by an application server or its components as described herein. For example, the operations of method 1100 may be performed by a differential privacy handler as described with reference to FIGS. 5 through 7. In some examples, an application server may execute a set of instructions to control the functional elements of the application server to perform the functions described below. Additionally or alternatively, an application server may perform aspects of the functions described below using special-purpose hardware.

At 1105, the application server may receive, from an application, a query including a request for data stored as ciphertext at a database. The query may include a field-level operation. The operations of 1105 may be performed according to the methods described herein. In some examples, aspects of the operations of 1105 may be performed by a query reception component as described with reference to FIGS. 5 through 7.

At 1110, the application server may identify a differential privacy mechanism applicable to the query, the data, or both. The operations of 1110 may be performed according to the methods described herein. In some examples, aspects of the operations of 1110 may be performed by a differential privacy identifier as described with reference to FIGS. 5 through 7.

At 1115, the application server may transform the query to include a noisification function based on the differential privacy mechanism. The operations of 1115 may be performed according to the methods described herein. In some examples, aspects of the operations of 1115 may be performed by a query transformation component as described with reference to FIGS. 5 through 7.

At 1120, the application server may execute the transformed query at the database. Executing the transformed query may involve adding noise to a query result at the database prior to decrypting the ciphertext to obtain a noisified query result according to the noisification function. The noise may be added according to 1125, 1130, 1135, and 1040. The operations of 1120 may be performed according to the methods described herein. In some examples, aspects of the operations of 1120 may be performed by a query execution component as described with reference to FIGS. 5 through 7.

At 1125, the application server may identify a set of encrypted fields in the database including the ciphertext, where the ciphertext is encrypted according to a homomorphic encryption key. The operations of 1125 may be performed according to the methods described herein. In some examples, aspects of the operations of 1125 may be performed by a field-level operation handler as described with reference to FIGS. 5 through 7.

At 1130, the application server may determine a set of noise values, where each noise value of the set of noise values corresponds to a respective field of the set of fields. The operations of 1130 may be performed according to the methods described herein. In some examples, aspects of the operations of 1130 may be performed by a field-level operation handler as described with reference to FIGS. 5 through 7.

At 1135, the application server may encrypt the set of noise values using the homomorphic encryption key. The operations of 1135 may be performed according to the methods described herein. In some examples, aspects of the operations of 1135 may be performed by a field-level operation handler as described with reference to FIGS. 5 through 7.

At 1140, the application server may add the set of encrypted noise values to the set of encrypted fields based on the field-level operation to obtain a set of noisified encrypted field values, where the noisified query result includes the set of noisified encrypted field values. The operations of 1140 may be performed according to the methods described herein. In some examples, aspects of the operations of 1140 may be performed by a field-level operation handler as described with reference to FIGS. 5 through 7.

At 1145, the application server may receive, from the database and in response to the transformed query, the noisified query result including the ciphertext based on executing the transformed query. The operations of 1145 may be performed according to the methods described herein. In some examples, aspects of the operations of 1145 may be performed by a results component as described with reference to FIGS. 5 through 7.

A method for data processing is described. The method may include receiving, from an application, a query including a request for data stored as ciphertext at a database, identifying a differential privacy mechanism applicable to the query, the data, or both, transforming the query to include a noisification function based on the differential privacy mechanism, executing the transformed query at the database, where the executing includes adding noise to a query result at the database prior to decrypting the ciphertext to obtain a noisified query result according to the noisification function, and receiving, from the database and in response to the transformed query, the noisified query result including the ciphertext based on executing the transformed query.

An apparatus for data processing is described. The apparatus may include a processor, memory coupled with the processor, and instructions stored in the memory. The instructions may be executable by the processor to cause the apparatus to receive, from an application, a query including a request for data stored as ciphertext at a database, identify a differential privacy mechanism applicable to the query, the data, or both, transform the query to include a noisification function based on the differential privacy mechanism, execute the transformed query at the database, where the executing includes adding noise to a query result at the database prior to decrypting the ciphertext to obtain a noisified query result according to the noisification function, and receive, from the database and in response to the transformed query, the noisified query result including the ciphertext based on executing the transformed query.

Another apparatus for data processing is described. The apparatus may include means for receiving, from an application, a query including a request for data stored as ciphertext at a database, means for identifying a differential privacy mechanism applicable to the query, the data, or both, means for transforming the query to include a noisification function based on the differential privacy mechanism, means for executing the transformed query at the database, where the executing includes adding noise to a query result at the database prior to decrypting the ciphertext to obtain a noisified query result according to the noisification function, and means for receiving, from the database and in response to the transformed query, the noisified query result including the ciphertext based on executing the transformed query.

A non-transitory computer-readable medium storing code for data processing is described. The code may include instructions executable by a processor to receive, from an application, a query including a request for data stored as ciphertext at a database, identify a differential privacy mechanism applicable to the query, the data, or both, transform the query to include a noisification function based on the differential privacy mechanism, execute the transformed query at the database, where the executing includes adding noise to a query result at the database prior to decrypting the ciphertext to obtain a noisified query result according to the noisification function, and receive, from the database and in response to the transformed query, the noisified query result including the ciphertext based on executing the transformed query.

Some examples of the method, apparatuses, and non-transitory computer-readable medium described herein may further include operations, features, means, or instructions for decrypting the ciphertext for the noisified query result and transmitting, to the application and in response to the query, the noisified query result including the decrypted ciphertext.

In some examples of the method, apparatuses, and non-transitory computer-readable medium described herein, the query may be a statistical query and some examples of the method, apparatuses, and non-transitory computer-readable medium described herein may further include operations, features, means, or instructions for performing one or more statistical operations on the noisified query result based on the decrypted ciphertext and the statistical query.

In some examples of the method, apparatuses, and non-transitory computer-readable medium described herein, the ciphertext for the noisified query result may be decrypted external to the database.

In some examples of the method, apparatuses, and non-transitory computer-readable medium described herein, transforming the query further may include operations, features, means, or instructions for performing one or more calls to one or more UDFs based on the query, the differential privacy mechanism, or both.

Some examples of the method, apparatuses, and non-transitory computer-readable medium described herein may further include operations, features, means, or instructions for encrypting the data to obtain the ciphertext and storing the ciphertext at the database, where the stored ciphertext may be noise-free.

In some examples of the method, apparatuses, and non-transitory computer-readable medium described herein, the query may be associated with an analytics operation, and the differential privacy mechanism may be identified based on the analytics operation. Some examples of the method, apparatuses, and non-transitory computer-readable medium described herein may further include operations, features, means, or instructions for receiving, from a second application, a second query including a second request for at least a portion of the data, where the second query may be associated with a permissioned user request, executing the second query at the database to obtain a query result including second ciphertext associated with the portion of the data, receiving, from the database and in response to the second query, the query result including the second ciphertext based on executing the second query, decrypting the second ciphertext for the query result to obtain the portion of the data, where the portion of the data may be noise-free based on the storing and the second query being associated with the permissioned user request, and transmitting, to the second application and in response to the second query, the portion of the data.

In some examples of the method, apparatuses, and non-transitory computer-readable medium described herein, the noisification function may be associated with a level of noise. Some examples of the method, apparatuses, and non-transitory computer-readable medium described herein may further include operations, features, means, or instructions for determining the level of noise for the noisification function based on a preference of an owner of the data, a user identifier associated with the query, an analytics operation associated with the query, or a combination thereof.

In some examples of the method, apparatuses, and non-transitory computer-readable medium described herein, the query may include a COUNT operation and adding the noise to the query result at the database further may include operations, features, means, or instructions for calculating one or more aggregate values based on the ciphertext and the COUNT operation, where each aggregate value of the one or more aggregate values may be associated with a corresponding ciphertext label, determining one or more noise values, and adding the one or more noise values to at least one of the one or more aggregate values to obtain one or more noisified aggregate values, where the noisified query result includes the one or more noisified aggregate values and where each noisified aggregate value of the one or more noisified aggregate values may be associated with the corresponding ciphertext label.

In some examples of the method, apparatuses, and non-transitory computer-readable medium described herein, the query may include a field-level operation and adding the noise to the query result at the database further may include operations, features, means, or instructions for identifying a set of encrypted fields in the database including the ciphertext, where the ciphertext may be encrypted according to a homomorphic encryption key, determining a set of noise values, where each noise value of the set of noise values corresponds to a respective field of the set of fields, encrypting the set of noise values using the homomorphic encryption key, and adding the set of encrypted noise values to the set of encrypted fields based on the field-level operation to obtain a set of noisified encrypted field values, where the noisified query result includes the set of noisified encrypted field values.

In some examples of the method, apparatuses, and non-transitory computer-readable medium described herein, the database may be a relational database, the field-level operation may include a row-level operation, a JOIN operation, or a combination thereof in the relational database, and the set of encrypted fields corresponds to a column in the relational database.

In some examples of the method, apparatuses, and non-transitory computer-readable medium described herein, the database may be a relational database, and the data may be stored as first ciphertext in a first column of the relational database and as second ciphertext in a second column of the relational database, where the first ciphertext may be encrypted according to a first homomorphic encryption method and the second ciphertext may be encrypted according to a second homomorphic encryption method different from the first homomorphic encryption method.

In some examples of the method, apparatuses, and non-transitory computer-readable medium described herein, the ciphertext may be an example of the first ciphertext and executing the transformed query at the database further may include operations, features, means, or instructions for determining to use the first column for executing the transformed query based on the first homomorphic encryption method supporting the differential privacy mechanism.

Some examples of the method, apparatuses, and non-transitory computer-readable medium described herein may further include operations, features, means, or instructions for refraining from handling a plaintext version of the data in the database based on adding the noise to the query result at the database prior to decrypting the ciphertext.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
   receiving, from an application, a query comprising a request for data stored as ciphertext at a database;
   identifying a differential privacy mechanism applicable to the query, the data, or both;
   transforming the query to comprise a noisification function based at least in part on the differential privacy mechanism;
   executing the transformed query at the database, wherein the executing comprises adding noise to a query result at the database prior to decrypting the ciphertext to obtain a noisified query result according to the noisification function; and
   receiving, from the database and in response to the transformed query, the noisified query result comprising the ciphertext based at least in part on executing the transformed query.

2. The method of claim 1, further comprising:
   decrypting the ciphertext for the noisified query result; and
   transmitting, to the application and in response to the query, the noisified query result comprising the decrypted ciphertext.

3. The method of claim 2, wherein the query comprises a statistical query, the method further comprising:
   performing one or more statistical operations on the noisified query result based at least in part on the decrypted ciphertext and the statistical query.

4. The method of claim 2, wherein the ciphertext for the noisified query result is decrypted external to the database.

5. The method of claim 1, wherein transforming the query further comprises:
   performing one or more calls to one or more user-defined functions based at least in part on the query, the differential privacy mechanism, or both.

6. The method of claim 1, further comprising:
   encrypting the data to obtain the ciphertext; and
   storing the ciphertext at the database, wherein the stored ciphertext is noise-free.

7. The method of claim 6, wherein:
   the query is associated with an analytics operation; and
   the differential privacy mechanism is identified based at least in part on the analytics operation, the method further comprising:
      receiving, from a second application, a second query comprising a second request for at least a portion of the data, wherein the second query is associated with a permissioned user request;
      executing the second query at the database to obtain a query result comprising second ciphertext associated with the portion of the data;
      receiving, from the database and in response to the second query, the query result comprising the second ciphertext based at least in part on executing the second query;
      decrypting the second ciphertext for the query result to obtain the portion of the data, wherein the portion of the data is noise-free based at least in part on the storing and the second query being associated with the permissioned user request; and
      transmitting, to the second application and in response to the second query, the portion of the data.

8. The method of claim 1, wherein the noisification function is associated with a level of noise, the method further comprising:
   determining the level of noise for the noisification function based at least in part on a preference of an owner of the data, a user identifier associated with the query, an analytics operation associated with the query, or a combination thereof.

9. The method of claim 1, wherein the query comprises a count operation and adding the noise to the query result at the database further comprises:
   calculating one or more aggregate values based at least in part on the ciphertext and the count operation, wherein each aggregate value of the one or more aggregate values is associated with a corresponding ciphertext label;

determining one or more noise values; and adding the one or more noise values to at least one of the one or more aggregate values to obtain one or more noisified aggregate values, wherein the noisified query result comprises the one or more noisified aggregate values and wherein each noisified aggregate value of the one or more noisified aggregate values is associated with the corresponding ciphertext label.

10. The method of claim 1, wherein the query comprises a field-level operation and adding the noise to the query result at the database further comprises:

identifying a plurality of encrypted fields in the database comprising the ciphertext, wherein the ciphertext is encrypted according to a homomorphic encryption key;

determining a plurality of noise values, wherein each noise value of the plurality of noise values corresponds to a respective field of the plurality of fields;

encrypting the plurality of noise values using the homomorphic encryption key; and adding the plurality of encrypted noise values to the plurality of encrypted fields based at least in part on the field-level operation to obtain a plurality of noisified encrypted field values, wherein the noisified query result comprises the plurality of noisified encrypted field values.

11. The method of claim 10, wherein:

the database comprises a relational database;

the field-level operation comprises a row-level operation, a join operation, or a combination thereof in the relational database; and the plurality of encrypted fields comprises a column in the relational database.

12. The method of claim 1, wherein:

the database comprises a relational database; and the data is stored as first ciphertext in a first column of the relational database and as second ciphertext in a second column of the relational database, wherein the first ciphertext is encrypted according to a first homomorphic encryption method and the second ciphertext is encrypted according to a second homomorphic encryption method different from the first homomorphic encryption method.

13. The method of claim 12, wherein the ciphertext comprises the first ciphertext and executing the transformed query at the database further comprises:

determining to use the first column for executing the transformed query based at least in part on the first homomorphic encryption method supporting the differential privacy mechanism.

14. The method of claim 1, further comprising:

refraining from handling a plaintext version of the data in the database based at least in part on adding the noise to the query result at the database prior to decrypting the ciphertext.

15. An apparatus for data processing, comprising:

a processor;

memory coupled with the processor; and instructions stored in the memory and executable by the processor to cause the apparatus to:

receive, from an application, a query comprising a request for data stored as ciphertext at a database;

identify a differential privacy mechanism applicable to the query, the data, or both;

transform the query to comprise a noisification function based at least in part on the differential privacy mechanism;

execute the transformed query at the database, wherein the executing comprises adding noise to a query result at the database prior to decrypting the ciphertext to obtain a noisified query result according to the noisification function; and receive, from the database and in response to the transformed query, the noisified query result comprising the ciphertext based at least in part on executing the transformed query.

16. The apparatus of claim 15, wherein the instructions are further executable by the processor to cause the apparatus to:

decrypt the ciphertext for the noisified query result; and transmit, to the application and in response to the query, the noisified query result comprising the decrypted ciphertext.

17. The apparatus of claim 15, wherein the instructions to transform the query further are executable by the processor to cause the apparatus to:

perform one or more calls to one or more user-defined functions based at least in part on the query, the differential privacy mechanism, or both.

18. The apparatus of claim 15, wherein the instructions are further executable by the processor to cause the apparatus to:

encrypt the data to obtain the ciphertext; and store the ciphertext at the database, wherein the stored ciphertext is noise-free.

19. The apparatus of claim 15, wherein the noisification function is associated with a level of noise, and the instructions are further executable by the processor to cause the apparatus to:

determine the level of noise for the noisification function based at least in part on a preference of an owner of the data, a user identifier associated with the query, an analytics operation associated with the query, or a combination thereof.

20. A non-transitory computer-readable medium storing code for data processing, the code comprising instructions executable by a processor to:

receive, from an application, a query comprising a request for data stored as ciphertext at a database;

identify a differential privacy mechanism applicable to the query, the data, or both;

transform the query to comprise a noisification function based at least in part on the differential privacy mechanism;

execute the transformed query at the database, wherein the executing comprises adding noise to a query result at the database prior to decrypting the ciphertext to obtain a noisified query result according to the noisification function; and receive, from the database and in response to the transformed query, the noisified query result comprising the ciphertext based at least in part on executing the transformed query.

* * * * *